United States Patent
Kragh

(10) Patent No.: US 12,377,618 B2
(45) Date of Patent: *Aug. 5, 2025

(54) EXTRUSION AND/OR PULTRUSION DEVICE AND METHOD

(71) Applicant: Reliefed AB, Varberg (SE)

(72) Inventor: Mark Kragh, Varberg (SE)

(73) Assignee: Reliefed AB, Varberg (SE)

( * ) Notice: Subject to any disclaimer, the term of this patent is extended or adjusted under 35 U.S.C. 154(b) by 294 days.

This patent is subject to a terminal disclaimer.

(21) Appl. No.: 18/032,369

(22) PCT Filed: Oct. 12, 2021

(86) PCT No.: PCT/EP2021/078187
§ 371 (c)(1),
(2) Date: Apr. 18, 2023

(87) PCT Pub. No.: WO2022/084108
PCT Pub. Date: Apr. 28, 2022

(65) Prior Publication Data
US 2023/0405947 A1    Dec. 21, 2023

(30) Foreign Application Priority Data

Oct. 20, 2020 (SE) .................................. 2051218-2

(51) Int. Cl.
*B29C 48/35* (2019.01)
*B21C 23/14* (2006.01)
(Continued)

(52) U.S. Cl.
CPC .......... *B29C 70/526* (2013.01); *B21C 23/142* (2013.01); *B21C 25/02* (2013.01);
(Continued)

(58) Field of Classification Search
CPC .......... B29C 48/35; B29C 48/21; B29C 48/49
See application file for complete search history.

(56) References Cited

U.S. PATENT DOCUMENTS 3,869,304 A * 3/1975 Bogulslawski ....... B29C 48/305
  118/410
4,683,095 A * 7/1987 Tolonen ................. B29C 48/49
  425/327
(Continued)

FOREIGN PATENT DOCUMENTS

EP   0484868 A1 * 5/1992 ............ B29C 48/22
EP   1543938 A1    6/2005
(Continued)

OTHER PUBLICATIONS

Patent Cooperation Treaty (PCT), International Search Report and Written Opinion for Application PCT/EP2021/078187 filed Oct. 12, 2021, mailed Jan. 10, 2022, International Searching Authority, EP.

(Continued)

*Primary Examiner* — Atul P. Khare
(74) *Attorney, Agent, or Firm* — McDonald Hopkins LLC

(57) ABSTRACT

A method and an extrusion or pultrusion device for forming a profile product made from a material in a production direction, said device comprising a rotating die, extending in a radial direction and a width direction, having two opposite first and second side walls and an outer circumferential surface extending in the width direction therebetween, wherein the rotating die comprises a first side portion in connection to the first side wall and a second side portion in connection to the second side wall and a mid-portion extending between the first and second side portions, and a profile definition zone having a longitudinal direction coinciding with the production direction, a height direction and a width direction being perpendicular to the height direction, comprising a through channel comprising a first channel section followed by a second channel section downstream the first channel section with reference to the production direction, wherein the rotating die is rotatable about an axis extending across the production direction and arranged to allow the (Continued)

outer circumferential surface to, while the rotating die rotates, exert a pressure onto a surface of the material when fed through the profile definition zone.

25 Claims, 20 Drawing Sheets

(51) Int. Cl.
| | | |
|---|---|---|
| *B21C 25/02* | (2006.01) | |
| *B21C 35/02* | (2006.01) | |
| *B29C 43/34* | (2006.01) | |
| *B29C 43/46* | (2006.01) | |
| *B29C 48/00* | (2019.01) | |
| *B29C 48/21* | (2019.01) | |
| *B29C 48/34* | (2019.01) | |
| *B29C 48/49* | (2019.01) | |
| *B29C 70/52* | (2006.01) | |
| *B29D 99/00* | (2010.01) | |
| *B29C 48/154* | (2019.01) | |
| *B29C 55/30* | (2006.01) | |
| *B29L 31/00* | (2006.01) | |

(52) U.S. Cl.
CPC ............ *B21C 35/023* (2013.01); *B29C 43/34* (2013.01); *B29C 43/46* (2013.01); *B29C 48/0011* (2019.02); *B29C 48/002* (2019.02); *B29C 48/21* (2019.02); *B29C 48/34* (2019.02); *B29C 48/35* (2019.02); *B29C 48/49* (2019.02); *B29C 70/527* (2013.01); *B29C 70/528* (2013.01); *B29D 99/0003* (2013.01); *B29C 2043/463* (2013.01); *B29C 48/154* (2019.02); *B29C 55/30* (2013.01); *B29L 2031/001* (2013.01)

(56) References Cited

U.S. PATENT DOCUMENTS

| | | | | |
|---|---|---|---|---|
| 5,453,238 | A * | 9/1995 | Bardy | B29C 48/21 |
| | | | | 425/327 |
| 5,928,679 | A * | 7/1999 | Ohki | B29C 48/49 |
| | | | | 425/374 |
| 8,393,291 | B2 * | 3/2013 | Emoto | H01M 4/1391 |
| | | | | 118/232 |
| 10,875,069 | B2 * | 12/2020 | Jansson Kragh | B29C 48/07 |
| 2006/0099289 | A1 * | 5/2006 | Fukumura | B29C 48/301 |
| | | | | 264/177.1 |
| 2018/0207698 | A1 | 7/2018 | Kragh | |

FOREIGN PATENT DOCUMENTS

| | | |
|---|---|---|
| JP | H0716643 A | 1/1995 |
| JP | 4017454 | 12/2007 |
| SE | 604300 | 12/1996 |
| SE | 2051100 A1 | 11/2020 |
| SE | 2051101 | 11/2020 |
| SE | 543400 | 1/2021 |
| SE | 543401 | 1/2021 |
| SE | 543402 | 1/2021 |

OTHER PUBLICATIONS

"The future with 3D-iExtrusion Technology-Reliefed Technologies," 2020. pp. 1-4, XP055874042, URL: http://web.archive.org/web/20200924003011/http://reliefed.com/the-technology/.

Sumerak et al., "Pultrusion Process Troubleshooting insulation." XP055875402, Handbook of Troubleshooting Plastics Processes: A Practical Guide, 2012, New Jersey.

Subramanian, "Compression Molding," XP055874115, Handbook of Troubleshooting Plastics Processes: A Practical Guide, 2012, New Jersey.

* cited by examiner

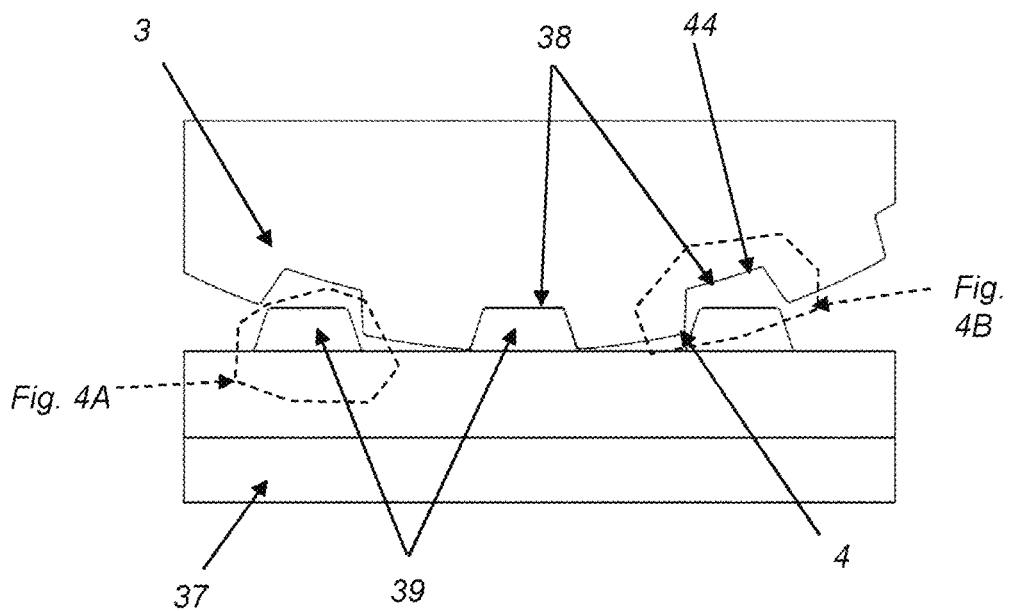
Fig. 4
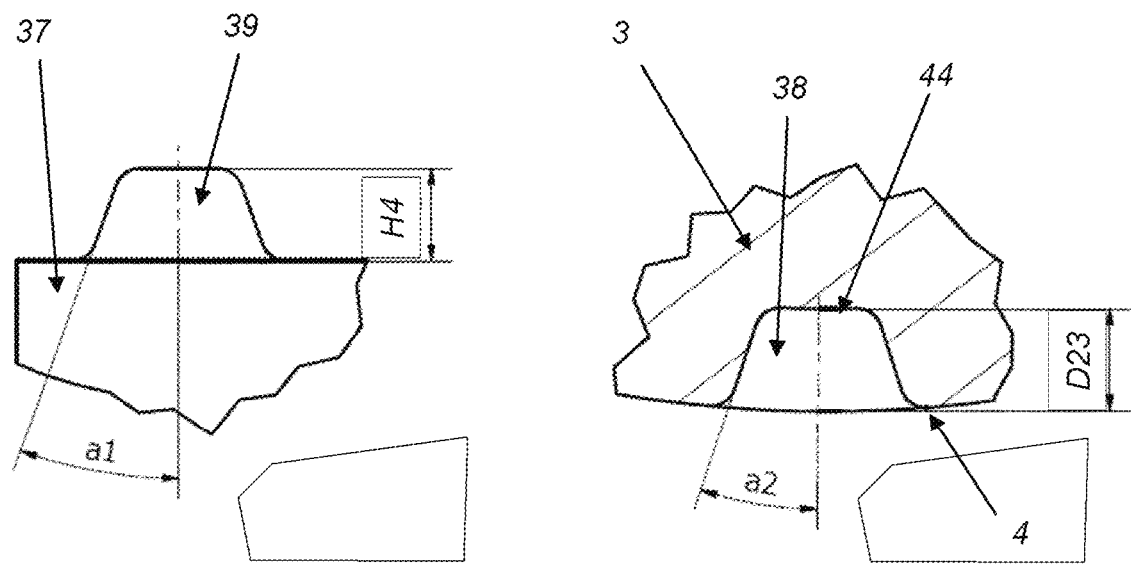
Fig. 4A                                   Fig. 4B

EXTRUSION AND/OR PULTRUSION DEVICE AND METHOD

CROSS-REFERENCE TO RELATED APPLICATION

This application is a 35 U.S.C. § 371 national stage application of PCT Application No. PCT/EP2021/078187 filed on Oct. 12, 2021 entitled "AN EXTRUSION AND/OR PULTRUSION DEVICE AND METHOD," which claims priority to Sweden Patent Application No. 2051218-2 filed on Oct. 20, 2020, each of which are incorporated herein in their entirety by reference.

TECHNICAL FIELD

The invention relates to an extrusion and/or pultrusion device for forming a profile product made from a material in a production direction, said device comprising:
- a rotating die, extending in a radial direction and a width direction, having two opposite first and second side walls and an outer circumferential surface extending in the width direction there between, wherein the rotating die comprises a first side portion in connection to the first side wall and a second side portion in connection to the second side wall and a mid-portion extending between the first and second side portions, and
- a profile definition zone having a longitudinal direction coinciding with the production direction, a height direction and a width direction being perpendicular to the height direction, comprising a through channel comprising a first channel section followed by a second channel section downstream the first channel section with reference to the production direction, wherein the rotating die is rotatable about an axis extending across the production direction and arranged to allow the outer circumferential surface to, while the rotating die rotates, exert a pressure onto a surface of the material when fed through the profile definition zone
- the first channel section is circumferentially delimited by one or more walls and wherein
- the second channel section is circumferentially delimited by
- the circumferential surface of the rotating die and
- a channel portion comprising
- a counter-bearing opposite the rotating die and
- opposing first and second channel portion side walls between the rotating die and the counter-bearing.

The invention also relates to a method for producing a profile product by use of such a device.

BACKGROUND ART

In the field of extrusion and/or pultrusion devices it is known using a rotating die immediately downstream a more traditional extrusion and/or pultrusion device using fixed or static walls. This type of extrusion with a rotating die is hereinafter referred to as 3D-extrusion and relates to that the rotating die operates in a pressurized zone in connection to the more traditional extrusion and/or pultrusion portion of the device, which differs 3D-extrusion from calendaring. The combination of the static walls in the first channel section and a rotating die in the second channel section gives the benefit of producing a profile product at a very high speed with maintained high quality of shape and imprint. It is thus an effective and relatively cheap production method that can be used for most materials that can be formed by use of extrusion, i.e. everything from e.g. plastic to aluminium.

In PCT/SE2020/050451 it is discussed the advantage of optimising the first channel section and the second channel section with regard to minimum side leakage.

SUMMARY OF THE INVENTION

With reference to background art, there is however a need for an improved optimization along the profile definition zone, i.e. of the first channel section and the second channel section, when extruding materials that undergo plastic deformation and/or materials made from a viscoelastic material and/or plastically deformable material with elastic property and/or viscoplastic material with elastic property. The load rate of the material in the first channel is controlled with reference to the load rate in the second channel by design of the respective first channel and second channel. This is further emphasised when producing a layered or embedded profile product comprising same or different materials.

The claimed device comprises both static and moving part and operates at high production rate and high pressure, and sometimes under high temperature and pressure. The settings for the device is dependent on material and type of profile to be produced. Experiments performed during a long time span has revealed that materials that undergo plastic deformation have special features/properties that have to be taken into account in order to produce a profile product with high quality in the claimed device and at the same time design the device in a way to make it withstand the high forces during operation. In the same manner, materials that undergo plastic deformation and has an elastic property have special features/properties that have to be taken into account in order to produce a profile product with high quality in the claimed device and at the same time design the device in a way to make it withstand the high forces during operation. The following definitions are introduced in order to give a reader information on suitable such materials and settings of the device.

Plastically Deformable Materials

Some materials, for example metals, deform permanently when subjected to a sufficiently high force. Permanent deformation is generally referred to as plastic deformation and materials which exhibit this type of deformation may therefore be denominated "plastically deformable materials". The deformation behaviour in a plastic deformable material depends on the magnitude of the force that the material is subject to and is often described in so called "stress-strain curves". Generally, plastically deformable material exhibit the following deformation behaviour.

When the material is subjected to a small force it deforms elastically because the stress in the material increases the distance between the atoms in the material but does not affect their mutual arrangement. Therefore, the material reverts linearly to its original dimension when the force is removed. Thus, in this force region the material exhibits a linearly elastic deformation behaviour.

If a larger force is applied to the material, the stress in the material increases. When the stress passes the so-called elastic limit, the atom planes in the material begin to slide over one another. This effect is not reversed if the force is removed and a permanent deformation of the material is therefore achieved. Thus, in this force region the material exhibit a plastic deformation behaviour.

If the force is increased further, the stress will exceed the rupture limit of the material and the material will eventually break.

Viscoplastic Materials

Viscoplasticity is a theory that describes materials which behave as solids below a critical values of stress but flows like a viscous liquid at greater values of stress. For metals and alloys, viscoplasticity is the macroscopic behavior caused by a mechanism linked to the movement of dislocations in grains, with superposed effects of inter-crystalline gliding. The mechanism usually becomes dominant at temperatures greater than approximately one third of the absolute melting temperature. Thus, these materials become viscoplastic materials above this critical temperature.

A main difference of viscoplastic materials in comparison to non-viscoplastic material is that the viscoplastic material exhibit a rate-dependent deformation behavior in force region of plastic deformation. That is, the viscoplastic-material does not only deform permanently after the application of the force but continue to undergo a creep flow as a function of time under the influence of the applied force. This creep flow deforms the material further.

Viscoelastic Materials

Viscous materials, like glycerine, oil or water, resist shear flow and strain linearly with time when a stress is applied. In pure viscous fluids, deformation is non-recoverable due to rearrangement of molecules. Elastic materials strain when stretched and immediately return to their original state once the stress is removed.

A material is said to be viscoelastic if the material has an elastic (recoverable) part as well as a viscous (nonrecoverable) part. When a load is applied onto a viscoelastic material, the elastic deformation is instantaneous while deformation of the viscous part occurs over time.

Since viscoelastic materials have elements of both elastic (recoverable) character viscous (nonrecoverable) character it is said to exhibit time-dependent strain, i.e. it deforms over time by so called creep. Viscoelastic materials may also be strain rate-dependent, i.e. they deform differently depending on how fast the load is applied.

Examples of viscoelastic materials are polymers, their viscoelastic behaviour may be explained by entanglement and disentanglement processes on a molecular level of polymer chains.

With reference to the above definitions, the present invention relates to a device that extrudes and/or pultrudes a material that do not undergo any major recoverable, i.e. elastic, transitions springing back from a deformed state to a less deformed state, but only to plastically deformable materials. A non-exhaustive list of examples of such materials are; aluminium, ceramics, alloys, composites, food candy, pasta, etc., or to a device that extrudes and/or pultrudes a material that undergoes a recoverable, i.e. elastic, transition springing back from a deformed state to a less deformed state. A non-exhaustive list of examples of such materials are; rubber, liquorice, food and polymers, etc.

The invention relates to an extrusion and/or pultrusion device for forming a profile product made from a material in a production direction, said device comprising:
    a rotating die, extending in a radial direction and a width direction, having two opposite first and second side walls and an outer circumferential surface extending in the width direction there between, wherein the rotating die comprises a first side portion in connection to the first side wall and a second side portion in connection to the second side wall and a mid-portion extending between the first and second side portions, and
    a profile definition zone having a longitudinal direction coinciding with the production direction, a height direction and a width direction being perpendicular to the height direction, comprising a through channel comprising a first channel section followed by a second channel section downstream the first channel section with reference to the production direction,
wherein the rotating die is rotatable about an axis extending across the production direction and arranged to allow the outer circumferential surface to, while the rotating die rotates, exert a pressure onto a surface of the material when fed through the profile definition zone, wherein;
    the first channel section is circumferentially delimited by one or more walls and wherein
    the second channel section is circumferentially delimited by
        the circumferential surface of the rotating die and
        a channel portion comprising
        a counter-bearing opposite the rotating die and
        opposing first and second channel portion side walls between the rotating die and the counter-bearing
wherein the device comprises at least two inlet channels that connects directly or indirectly to the second channel section, wherein each of the at least two inlet channels is configured to feed one or more materials at a predetermined distance upstream from the second channel section or to a marriage point for the at least two inlet channels in connection to where the first channel section transitions into the second channel section.

One advantage here is that the profile product may comprise several layers of one or different material compositions and/or where a string of solid material, being stiff or bendable, can be embedded into the material that is formed. Here, solid material refers to a material that does not undergo any deformation in the profile definition zone. A non-exhaustive list of examples of solid materials are; bendable wire, stiff rod-like element, mesh of metal and/or fabric and/or composite and/or other suitable materials, a combination of such solid materials, etc.

According to one example, the profile definition zone comprises a first inlet channel in the form of the first channel section and a second inlet channel in the form of a third channel section connected to the profile definition zone upstream the second channel section for feeding an additional material to the second channel section for forming a layered profile product with material from the first channel section.

According to one example, the third channel section is an extrusion or pultrusion channel similar to the first channel section arranged to work the material or wherein the third channel section is configured as a conveyer unit for conveying a material to the profile definition zone.

One advantage here is that the profile product may comprise several layers of one or different material compositions with different or same master profile cross-section and/where a string of solid material, being stiff or bendable, can be embedded into the material that is formed.

According to one example, the device comprises a third inlet channel in the form of a fourth channel section for feeding a third material to the profile definition zone, wherein the fourth channel section is an extrusion or pultrusion channel similar to the first channel section arranged to work the material or wherein the fourth channel section is configured as a conveyer unit for conveying a material to the profile definition zone.

One advantage here is that the profile product may have more than two layers or that a friction material is conveyed by one of the channels.

According to one example, the first inlet channel conveys a solid material, e.g. a wire or a the like, to the first channel section and where the second and third inlet channels introduces one or more materials to be extruded or pultruded in the first channel section and the second channel section, wherein the one or more materials are layered onto the solid material or surround the solid material.

One advantage here is that a robust and profile product is achieved. The solid layer may be stiff or bendable.

According to one example, the first inlet channel and the second inlet channel are arranged such that the material from the second inlet channel surrounds the solid material and embeds the solid material.

According to one example, the second inlet channel comprises a pressurized chamber upstream the first channel section for forming the material around the solid material, wherein the pressurized chamber comprises a back wall delimiting the pressurized chamber, wherein the second inlet channel comprises a feeding channel to the pressurized chamber for feeding the material to the chamber, wherein the back wall comprises the first inlet channel that conveys the solid material and acts as a stop for the material in the chamber to leak through the first inlet channel.

One advantage here is that the solid material is embedded in the profile product.

Here, pressurized means that the material in the second inlet channel is subject to pressure by the material being forced into the second inlet channel and deformed in a similar way as described above with relation to the first channel section.

One advantage here is that the different channel inlets may produce different master profiles that are superposed onto each other and further deformed in the second channel section.

According to one example, the first and second channel sections plastically deforms the material in a similar manner as described above. Plastic deformation may take place also in the pressurized chamber, but is not limited to such deformation. Hence, the material in the pressurized chamber may be formed to surround the solid material without being plastically deformed. Also materials made from a viscoelastic material and/or plastically deformable material with elastic property and/or viscoplastic material with elastic property can be formed in this example.

Here, solid material refers to a material that does not undergo any deformation in the profile definition zone. A non-exhaustive list of examples of solid materials are;
 bendable wire, stiff rod-like element, mesh of metal and/or fabric and/or composite and/or other suitable materials, a combination of such solid materials, etc.

According to one example, the different materials are brought together before the second channel section and is then worked in the second channel section.

One advantage here is that the two or more materials are formed together in the first channel section and further formed in in the second channel section.

The invention is not limited to three inlet channels or three channel sections, but further inlet channels and channel sections are possible in order to manufacture a profile product with same or different materials in different layers.

According to one example, the device is configured to feed a friction material between the counter-bearing and the final profile and/or configured to feed a friction material between the rotating die and the final profile.

According to one example, the friction material is conveyed by the first and/or the second and/or the third inlet channels at least during start-up of the device in order to control friction in connection to the rotating die and/or the counter bearing or wherein the friction material is conveyed by the first and/or the second and/or the third inlet channels during a part of or the entire manufacturing process in order to control friction in connection to the rotating die and/or the counter bearing.

According to one example, the friction material is fed directly to the rotating die such that the friction material rotates with the rotating die from a position before the second channel section to the second channels section.

According to one example, the device comprises an external friction material feeding device feeding the friction material to the rotating die.

As stated above, the friction material feeding device can be either of the first, second or third inlet channels. Furthermore, the friction material may be a solid material, a liquid or a gas, or a combination thereof.

One advantage here is that the friction material controls the friction between the rotating die and the material and/or the material and the counter bearing.

According to one example, the first channel section is configured to deform the material plastically into a master profile having a maximum height at a predetermined feeding rate dependent on material and minimum cross-sectional area with a first maximum height in the first channel section,
 and wherein the second channel section is configured to further deform the material into a final profile having a minimum height by the rotating die being configured to apply increasing pressure on the master profile against the counter-bearing when the master profile exits the first channel section,
 wherein the rotating die is configured at a minimum distance between the rotating die and the counter-bearing dependent on a maximum allowable pressure applied by the rotating die at the position of that minimum distance, wherein the maximum allowable pressure corresponds to the maximum difference in height of the master profile and the final profile and dependent on pattern in the circumferential surface of the rotating die.

One advantage here is that maximum allowable pressure is controlled in both the first- and second channel which gives the possibility to design the extrusion and/or pultrusion device dependent on material to be processed and process speed. Controlling the maximum allowable pressure dependent on material to be processed allows for a production rate with high quality output and reduces risk for e.g. rupture due to a too high stress on the material and further reduces risk for damaging the device.

According to one example, the first channel section is configured to plastically deform a material made from a viscoelastic material and/or plastically deformable material with elastic property and/or viscoplastic material with elastic property into a master profile having a maximum height at a predetermined feeding rate dependent on material and minimum cross-sectional area with a first maximum height in the first channel section when exiting the first channel section,
 wherein the first channel section comprises a wake element having a predetermined height dependent on the elastic property of the material,
 wherein the wake element is positioned in at least the height direction,
 and wherein the second channel section is configured to further deform the material into a final profile having a minimum height by the rotating die being configured to apply increasing pressure on the master profile against the counter-bearing when the master profile exits the first channel section, wherein the rotating die is configured at a minimum distance between the rotating die and the counter-bearing dependent on a maximum allowable pressure applied by the rotating die at the position of that minimum distance, wherein the maximum allowable pressure corresponds to the difference in height of the master profile and the final profile and dependent on pattern in the circumferential surface of the rotating die and dependent on the elastic property of the material and thus difference between the height of the final profile and the profile product due to the elasticity of the material.

One advantage here is that maximum allowable pressure is controlled in both the first- and second channel which gives the possibility to design the extrusion and/or pultrusion device dependent on material to be processed and process speed. Controlling the maximum allowable pressure dependent on material to be processed allows for a production rate with high quality output and reduces risk for e.g. rupture due to a too high stress on the material and further reduces risk for damaging the device.

A further advantage is that the wake element can be designed dependent on material elasticity giving the correct height of the master profile when entering the second channel section. Here, elasticity refers to the material swelling after having been pressed into shape in the first channel section. The wake element creates a wave form in the material when having passed the wake element.

According to one example, the wake element protrudes in a direction from the side wall into the first channel section. According to one example, the wake element protrudes in the height direction from the side wall into the first channel section According to one example, the wake element is arranged where the first channel section transitions into the second channel section, wherein the wake element comprises an upper edge with a lowest part, in the height direction, wherein the upper edge delimits an upper portion, in the height direction, of the wake element in the first channel section where the first channel section transitions into the second channel section.

One advantage here is that the wake element controls the master profile cross-section area in close vicinity to the rotating die. Different materials have different elastic properties and thus partly recovers shape, i.e. swells, after the wake element at different rates.

According to one example, the wake element is arranged at a predetermined distance upstream in the production direction from where the first channel section transitions into the second channel section.

One advantage here is that the wake element controls the master profile cross-section area before where the first channel section transitions into the second channel section, which allows for the material to recover shape after the wake element but still in the second channel section thus controlling the shape of the master profile immediately before entering the second channel section. Different materials have different elastic properties and thus partly recovers shape, i.e. swells, after the wake element at different rates. Some materials need a series of portions recovering shape in order to finally stay in its desired form in the profile product.

According to one example, the master profile height when exiting the first channel section is less than or equal to the master profile height in the second channel section before reaching the rotating die due to elasticity. The position of the wake element determines where and how the master profile is allowed to recover shape and the closer the wake element is to the where the rotating die has its minimum distance to the counter-bearing, the less possibility for the master profile to recover its shape in the second channel section.

According to one example, the first channel section comprises at least two side walls in the form of a top pre-bearing and an opposing bottom pre-bearing, wherein the top pre-bearing is arranged over the opposing bottom pre-bearing in the height direction, wherein the top pre-bearing and/or the bottom pre-bearing comprises the wake element.

The rotating die has a lowest position in the height direction at a position where the distance in the height direction between the circumferential surface and the counter-bearing is at a minimum, and the lowest position of the rotting die can be arranged below or above or at equal level as the lowest part of the upper edge of the wake element. It is a design feature determined by the elastic property of the material.

According to one example, the rotating die comprises a pattern comprising at least one indentation, wherein the rotating die is configured at a maximum distance between a bottom of the indentation and the counter-bearing dependent on a minimum allowable pressure applied by the rotating die at the position of that maximum distance for achieving plastic deformation of the material in the indentation.

The pattern in the rotating die causes a corresponding opposite pattern in the final profile, i.e. when the pattern in the rotating die comprises an indentation, it causes a corresponding opposite pattern comprising an elevation in the in the final profile.

The rotating die is thus configured at a maximum distance between the rotating die and the counter-bearing dependent on a minimum allowable pressure applied by the rotating die at the position of that minimum distance, wherein the minimum allowable pressure corresponds to the difference in height of the master profile and the final profile and dependent on pattern in the circumferential surface of the rotating die with regard to achieving the plastic deformation desired in the indentation, which minimum pressure depends on the material to be extruded and/or pultruded.

It should be noted that the pattern in the rotating die could be arranged such that the device simultaneously exhibits the minimum distance and the maximum distance if the pattern is arranged such that the indentation is positioned in the circumferential surface with surrounding portion(s) of the circumferential surface, at least in the width direction, comprising no indentations when facing the counter-bearing. As an alternative the pattern comprises a number of indentations spread in the width direction with such non-indentation portions between them facing the counter-bearing at the same time. Here, the rotating die exerts both maximum pressure in the non-indentation portion due to the minimum distance and minimum pressure in the indentation due to the minimum distance, at least during a short time interval during rotation of the rotating die. The design choice of maximum pressure and minimum pressure further allows for an optimized form change of the master profile to the final profile dependent on material such that the material in the indentation fills the indentation and becomes deformed at the same time as the material between the outermost parts, in the radial direction, of the rotating die does not exceed the maximum pressure allowed for the material and/or the design of the extrusion and/or pultrusion device. It should further be noted that some materials exhibit properties that allows for easy filling of the indentations due to the initial pressure difference between the inside and the outside of the indentation. When the indentation is filled a steady state condition, with regard to pressure difference, is achieved during a short time period. In such steady state condition the pressure in the material is balanced and the pressure difference is minimized. For some materials the pressure could be equal or essentially equal in both the indentation and the surrounding non-indentation part during that part of the operation when the indentation faces the counter bearing and the indentation is filled.

With reference to, but not being bound to, the above definitions, it is believed that a minimum pressure is required to achieve plastic deformation. For example, it is believed that aluminium has a minimum pressure level that depends on inter alia temperature and the higher the temperature the less pressure is required. However, a too high pressure and thus a too high temperature may result in the aluminium liquifying which removes the advantage of plastic deformation. The temperature increase in the material is at least in part achieved in the first channel section where the minimum cross-sectional area forces a form change of the material with pressure on the material in all directions in the first channel section and the form change increase the temperature. In the second channel section, the rotating die continues to change the shape of the master profile into the final profile by exerting a balanced pressure within the minimum and maximum limits. Should the rotating die comprise a pattern with one or more indentations, then the minimum pressure is also vital for filling the indentations in a manner with sufficient pressure to achieve plastic deformation within the indentation. At the same time, that part of the rotating die lacking indentations exerts a higher pressure on the master profile due to a lesser distance between the rotating die and the counter-bearing than between the bottom of the indentation and the counter-bearing. Hence, when the rotating die comprises indentations, i.e. a pattern, then both the minimum pressure and the maximum pressure becomes especially important and thus the respective maximum and minimum distance between the rotating die and the counter-bearing.

In order to more easily explain the device, a cylindrical coordinate system has been used for the rotating die and an orthogonal Cartesian coordinate system for a three-dimensional space for the device in general. The rotating die therefore is described as having a width direction from end to end coinciding with a centre line, i.e. rotation axis, about which the rotating die rotates, and a thickness in a radial direction being orthogonal to the width direction. The outer circumferential surface further extends about the axis in a rotation direction being perpendicular to the width direction. Here, rotation symmetric refers to a symmetrical disposition about the rotating axis or a rotational balanced disposition of the matter in the rotating die. The device in general, i.e. e.g. the profile definition zone, the first and second channel sections, is described as having a width direction, a height direction and a longitudinal direction, where the longitudinal direction coincides with the general production direction.

The rotating die is arranged to be rotatable about the axis and the axis can be directly or indirectly stored in and rotatably coupled to the first and second channel portion side walls.

With reference to the above-described coordinate systems it should be noted that the axis of the rotating die can be arranged perpendicular to the longitudinal direction, i.e. to the production direction of the device in general, or can be arranged at an angle.

According to one example, the axis of the rotating die is directed substantially perpendicular to the production direction with the outer circumferential surface extending across the production direction in a width direction thereof.

According to one example, the axis of the rotating die coincides with the width direction of the device in general and the width direction of the rotating die coincide with the width direction of the device in general. The longitudinal direction coincides with the production direction, i.e. the main direction along which the material travels during production.

According to one example, the axis of the rotating die does not coincide with the width direction of the device in general, but the axis of the rotating die and the width direction of the rotating die is arranged at an angle being less or more than 90° to the longitudinal direction. However, the axis of the rotating die is arranged such that the outer circumferential surface extends across the production direction in a width direction thereof.

With reference to either one of the two examples above, the normal to the axis of the rotating die coincides with the height direction of the device in general. Here, the normal coincides with the radial direction of the rotating die. Here, the axis of the rotating die is directed perpendicular to the normal of the production direction regardless of whether the axis of the rotating die coincide or not with the width direction of the device in general. However, according to one example the normal to the axis of the rotating die can be arranged at an angle to the height direction of the device in general. However, the axis of the rotating die is arranged such that the outer circumferential surface extends across the production direction in a width direction thereof, but at an angle to the production direction.

According to one example, the one or more walls define a first cross-section at the end of the first channel section and wherein the second channel section defines a second cross-section at a position where the distance between the circumferential surface and the counter-bearing is at a minimum. As stated above, the geometry of the first channel section is different from the second channel section such that the material passing through the first channel section changes form when entering the second channel section. The changing of form is essential for increasing or maintaining the pressure level to such an extent that it will overcome the internal resistance (shear stresses) of the material, fast enough, for the material to saturate the second cross section, including an imprint of the rotating die.

According to one example, the minimum distance in the height direction between the circumferential surface and the counter-bearing in the second cross-section is less than a maximum distance in the height direction in the first cross-section. This has the advantage that the material entering the second channel section will be compressed in the second channel section such that the pressure is increased or maintained to such level that the material will transform fast enough to saturate the second channel section, including the imprint of the rotating die.

Hence, the pressure is increased or maintained to such level that the material will transform fast enough to saturate the second channel section, including an imprint of the rotating die. The pressure is achieved by a combination of an imprint depth of a pattern in the circumferential surface and a Poisson effect and/or a combination of the shape transition due to the geometrical shape difference between the first and second cross-sections and the Poisson effect.

According to one example, the geometry of the first channel section is different from the second channel section such that the material passing through the first channel section changes form when entering the second channel section, wherein the master profile has a first cross-section area geometry corresponding to the first cross-section and wherein the final profile has a second cross-section area geometry defined by the second cross-section, wherein the first cross-section area geometry is different from the second cross-section area geometry in any given comparable position, wherein the maximum pressure and thus the minimum distance in the second channel section is dependent on a difference of cross-section area geometry of the master profile and the cross-section area geometry of the final profile.

This has the advantage that the second channel section can be optimized dependent on the level of material transformation from the master profile to the final profile.

According to one example, the rotating die is configured, before forming the profile product, to alter form during forming of the final profile dependent on the maximum allowable pressure and/or, wherein the counter-bearing is configured, before forming the profile product, to alter form during forming of the profile product dependent on the maximum allowable pressure.

This has the further advantage that the rotating die can be configured to change shape from a start-up procedure to steady state operation conditions due to heat and pressure during the production, giving a predicted shape of the final profile. This has the further advantage that the counter-bearing can be configured to change shape due to heat and pressure during the production, giving a predicted shape of the final profile in a similar manner.

According to one example, the first channel section comprises side walls in the form of a top pre-bearing and an opposing bottom pre-bearing. The top pre-bearing is arranged over the opposing bottom pre-bearing in the height direction and are advantageously positioned in or at least in the vicinity of where the first channel section transitions into the second channel section. One advantage here is that the top pre-bearing and/or the bottom pre-bearing can be optimised to release a certain master profile cross-section geometry into the second channel section.

According to one example, also the top pre-bearing and/or the bottom pre-bearing can be configured in a similar manner as the rotating die and/or the counter-bearing to change form from a start-up procedure to a steady state operation According to one example, the maximum pressure and thus the minimum distance in the second channel section is dependent on the total feeding rate of material in the first channel section, type of material, and temperature of the material when entering the second channel section.

This has the advantage that the second channel section can be optimized dependent on manufacturing speed and material.

According to one example, the maximum allowable pressure applied by the rotating die at the position of the minimum distance is dependent on friction between the material and the counter bearing in the second channel section.

This has the advantage that the pattern in the final profile can be optimized dependent on shear stress applied from the counter bearing in the second channel section due to friction.

According to one example, the cross-section area of the second channel section is configured to be sized with regard to a shrinking effect of the final profile cooling down to the profile product having a final height.

According to one example, the pattern in the rotating die is configured to be sized with regard to a shrinking effect of the final profile cooling down to the profile product.

According to one example, the rotating die is configured with a pattern with at least one indentation, wherein each indentation comprises a release angle dependent on the radius of the rotating die, the intended pattern in the final profile, the configuration of the counter bearing and travelling speed of the final profile in order to achieve the intended profile product. The release angle in the indentation is arranged with relation to a release angle in a corresponding elevation created in the final profile due to the material being pressed into the cavity. Since the rotating die rotates, the indentation can be arranged with a shape that is different from the shape in the profile product taking into account the rotation and release angles affect the shape of the elevation in the final profile when the elevation is released from the indentation in the production direction.

This has the advantage that the pattern in the final profile can be optimized dependent on design of the pattern in the rotation die.

According to one example, the device is configured to feed a friction material between the counter-bearing and the final profile and/or configured to feed a friction material between the rotating die and the final profile. One advantage here is that, the friction sheet can be used to define and therefore predict friction between the material in any of the first and/or second channels sections. The friction material can be a solid, liquid or gas and can be introduced into the device in nay suitable way. For example, the friction material can be introduced by feeding the material to the rotating die and/or the counter-bearing via a separate channel arranged in connection to the first channel section and/or the second channel section. The friction material can alternatively be introduced to the rotating die before the rotating die rotates into the second channel section, i.e. the friction material travels along with the rotating die to the material in the second channels section. The friction material can alternatively be introduced to the material before entering the first channel section, i.e. the friction material travels with the material to be extruded and/or pultruded. Should the friction material be a solid, it could be introduced as a sheet material or any suitable form that allows for the friction sheet to define friction between the material in any of the first and/or second channels sections. Should the friction material be a liquid, it can be introduced by dripping or injecting the liquid according to any one or a combination of the examples above, but is not limited to the examples. Should the friction material be a gas, it can be introduced by injecting the gas according to any one or a combination of the examples above, but is not limited to the examples.

The material that is fed into the device to form the profile product can be in the form of one homogenous material or a mixture of two or more materials that are blended and or layered. The materials can be blended in different ratios and may be blended into a homogeneous mix or a mix with gradients within the material. One material can be a solid and another material can be mouldable, e.g. stone bits and rubber. The material can also be a layered material comprising two or more layers of same or different materials. The material may comprise one or more strings of solid material that follow through the entire extrusion or pultrusion process, e.g. a wire or another reinforcement material.

According to one example, the width of the first channel section is, at least along a portion of its length and at least along a portion of its height, less than a distance between the two opposite side walls of the rotating die. Hence, the first channel section should be at least smaller in width than a distance between the opposing first and second channel portion side walls in the second channel section. The difference in width between the first channel section and the second channel section depends on features of the first and second side portions and tolerances between the rotating die and the respective opposing first and second channel portion side walls. The width of the first channel section should be less than a distance being the distance between the opposing first and second channel portion side walls minus the sum of tolerances, i.e. the sum of the gap between the rotating die side walls and the respective opposing first and second channel portion side walls in the second channel section. If the first and second side portion comprises flange portions, see below for further explanation, then the width of the first channel section is, at least along a portion of its length and at least along a portion of its height, less than a distance between the two flange portions.

One advantage here is that local pressure reduction is achieved in connection to the first and second outer edge portions due to the geometrical difference in the first and second channel sections.

According to one example, local pressure reduction is achieved in connection to the first and/or second side portions due to the geometrical difference in the first and second channel sections and a wake effect downstream the first channel section in connection to the first and/or second side portions.

According to one example, the first channel section comprises a third side portion extending in the width direction, wherein the third side portion is arranged in relation to the first side portion such that a pressure in the material to be extruded is less in connection to the first side portion than in connection to the third side portion, and/or
wherein the first channel section comprises a fourth side portion extending in the width direction, wherein the fourth side portion is arranged in relation to the second side portion such that a pressure in the material to be extruded is less in connection to the second side portion than in connection to the fourth side portion. One advantage is that third and fourth side portions creates a wake effect and thus a local pressure decrease downstream the third and fourth side portions that further decreases the local pressure in the first and second side portions of the rotating die.

According one example, the first channel section comprises leeward means in connection to the third and/or fourth side portions arranged to decrease the space of the first channel section in the height direction being perpendicular to the width direction.

According one example the first channel section comprises leeward means in connection to the third and/or fourth side portions arranged to decrease the space of the first channel section in the width direction. A combination of leeward means are also possible.

According to one example, the leeward means is an elevation facing into the through channel. The elevation can be arranged from top to bottom in the first channel section, or can be arranged as a part or several parts along the distance between the top to bottom of the first channel section. The leeward means are advantageously positioned in connection to the first and second side portions of the rotating die.

One advantage with the leeward means is that the third and fourth side portions further decreases the local pressure in connection to recesses and/or flange portions in the first and second side portions of the rotating die, see below.

According to one example, the second channel section is arranged in relation to the first channel section with a predetermined second distance between the radially outermost portion of the circumferential surface of the rotating die and the counter-bearing in the channel portion being less than a predetermined first distance between the most far apart portions of the first channel section taken in a height direction coinciding with the radial direction, and/or wherein:
the second channel section is arranged in relation to the first channel section with a predetermined fourth distance between the innermost narrowest portions of the channel portion in the width direction being greater than a predetermined third distance between side walls in the first channel section taken in the width direction at the exit area from the first channel section.

One advantage is that the narrower first channel section creates a wake effect with decreased pressure downstream in the first channel section and in connection to the first and second side portions of the rotating die due to that the second channels section is broader.

According to one example, the circumferential surface comprises a textured portion. The entire circumferential surface can be textured, but as an alternative only a portion can be textured.

According to one example, the circumferential surface is non-textured or has a micro pattern that leaves only an infinitesimal imprint on the profile product that can be visible or non-visible for the human eye.

According to one example, the channel portion comprises a second rotating die arranged opposite the first rotating die described above. The second rotating die can either replace the counter-bearing in its entirety or can be a part of a static counter-bearing. The second rotating die can be arranged in a similar way as the above described first rotating die to create same or different patterns on two sides of the profile product. The second rotating die can comprise recesses and/or flange portions that can be arranged to cooperate with recesses and/or flange portions of the first rotating die.

According to one example, the channel portion comprises a third rotating die arranged at an angle to the first rotating die. This rotating die replaces the opposing first or second channel portion side wall entirely or partly. The third rotating die can be arranged together with only the first rotating die or together with both the first and second rotating die.

According to one example, the channel portion comprises a fourth rotating die arranged opposite the third rotating die. The third rotating die can be arranged together with only the first rotating die or together with both the first and second rotating die The third and/or the fourth rotating die(s) can be arranged in a similar way as the above described first rotating die to create same or different patterns on two sides of the profile product. The second rotating die can comprise recesses and/or flange portions that can be arranged to cooperate with recesses and/or flange portions of the first rotating die.

According to one example, two or more rotating dies are synchronised. This has the advantage of feeding the material at the same speed. However, it could be possible to also use non-synchronous rotating dies in order to create friction and/or a special pattern and/or to compensate for material differences, or to achieve curved profiles, that follows a radius instead of a straight line at exit of the rotating die.

In all the above examples it is possible to use a combination of textured and non-textured rotating dies.

According to one example, the distance between indentations in the pattern on the rotating die is less than a distance between indentations in the corresponding pattern in the production direction on the profile product, wherein a pulling and stretching device is configured to stretch the final profile and/or the profile product so that high precision in distance between features on profile can be achieved by adjustment stretching According to one example, at least a part of the material should be plastically deformable when subject to the pressure applied in the first and/or second channel sections. Such materials are often denoted viscoelastic and/or viscoplastic materials.

Furthermore, extrusion relates to a process where a material is fed by pressure into the first channel section to be formed in the first and second channel sections. Pultrusion relates to where the material to be formed is fed to the device and drawn through the first and second channel sections. It should be noted that the device can be arranged purely for extrusion or purely for pultrusion or a combination of the two.

Furthermore, profile product refers to a product having a three dimensional form, i.e. length, width and height. The profile product may have a cross-section taken in the width and height plane being similar all along the length or may be different dependent on position in length. The cross-section can have any suitable two dimensional shape, for example, round, oval, elliptical, i.e. two sides, undulating, three or more sides or a combination of the same. One or more sides may be patterned, i.e. textured with one or more patterns. The pattern/texture is created by the rotating die.

It should be noted that the invention can be varied within the scope of the claims and that the examples described above and below should not be seen as limiting for the invention.

For example, the first channel section could be circumferentially delimited by static walls or could be arranged with one or more dynamic walls as long as the material can be extruded or pultruded with the device according to the invention. Static walls has the advantage of being cheap and robust.

According to one example, the first channel portions can be arranged centred with relation to the second channels. This has the advantage that the flow of material entering the second channel is evenly distributed. The first and second side portions can be arranged centred with respect to the first channel section with the advantage of having a evenly distributed decrease in pressure over the rotating die.

For example, the device could comprise several rotating devices arranged side by side, i.e. the rotating device could comprise two or more rotating devices having a common rotating axel. The different rotating devices could be arranged in separate second channels or could be arranged in a common separate channel. The different rotating devices could have the same or different texture to create same or different patterns on the profile product. The profile product could thus comprise one or more strands of internal profiles running along the production direction and being generated by the different rotating devices. The different strands could be separable into separate products at predetermined separation lines that could coincide with the separation of the different rotating devices. However, one separate rotating die could comprise a pattern/texture that separates similar or different patterns such that the profiled product comprises one or more strands of internal profiles running along the production direction. Also here, the strands could be separable in the profiled product.

According to one example, the rotating die and/or the counter-bearing comprises a cooling device that cools down the material when forming the final profile. This has the advantage that a predetermined temperature of the material is achieved for optimum material properties of the profile product. The material temperature when extruding and/or pultruding can for certain materials be crucial for the quality of the profile product. The temperature is also important due to frictional properties between the material and the rotating die and/or the counter-bearing. The cooling device can, for example, be arranged in the form of cooling circuits with gas or liquid fluid conductors arranged within the rotating die and/or the counter-bearing; and/or external devices cooling down the rotating die and/or the counter-bearing; and/or liquids or gaseous fluids added to the rotating die and/or the counter-bearing; or a combination of such devices or any other suitable cooling devices.

According to one example, the rotating die is configured to be cooled on the surface so that the temperature of the rotating die surface is below a predetermined allowed temperature of the extruded material.

According to one example, the rotating die is cooled on the surface so that the temperature of the rotating die surface is at least 10 degrees Celsius below a glass transition temperature or melting temperature of the material.

According to one example, the rotating die is cooled on the surface so that the temperature of the rotating die surface is at least 50 degrees Celsius below a glass transition temperature or melting temperature of the material, enabling higher speed of extruding.

The device can further be arranged for co-extrusion and/or on-extrusion with one or more inlet channels that connects to the first channel section. Hence, one or more materials could be fed to the first channel section via one channel, but two or more materials can be fed to the first channel section via one inlet channel or a multiple channel inlets. The multiple inlet channels can be the same in number as the number of materials or the multiple inlet channels can be less than the number of materials if two or more materials are fed via one inlet channel.

Two or more materials can be fed to the first channel section and/or the second channel section via one inlet channel or multiple channel inlets. The multiple inlet channels can be the same or more in number as the number of materials or the multiple inlet channels can be less than the number of materials if two or more materials are fed via one inlet channel.

The invention further relates to a co-extrusion device and/or an on-extrusion device comprising an extrusion and/or pultrusion device according to what has been described above. The co-extrusion device and/or an on-extrusion device comprises at least two inlet channels that connects directly or indirectly to the second channel section, wherein each of the at least two inlet channels is configured to feed one or more materials at a predetermined distance upstream from the second channel section or to a marriage point for the at least two inlet channels in connection to where the first channel section transitions into the second channel section.

One advantage is that co-extrusion and/or on-extrusion allows for manufacturing a layered profile product and/or a profile product with different materials and/or a profile product with a core embedded in a surrounding material, e.g. electrical wire, toothed belt etc.

According to one example, the device according to any of the examples above comprises a pulling and stretching device arranged downstream the second channel section and configured to pull the material in the production direction when exiting the second channel section for transforming the final profile to the profile product.

According to one example, the distance between indentations in the pattern on the rotating die is less than a distance between elevations in the corresponding pattern in the production direction on the profile product, wherein the pulling and stretching device is configured to stretch the final profile and/or the profile product so that high precision in distance between features on profile can be achieved by adjustment stretching. The distance between the indentations in the rotating die is taken in the rotation direction, i.e. along the circumferential surface in the rotation direction.

One advantage is that the pulling and stretching device dynamically can stretch the material in the final profile during its transition to profile product, e.g. in order to obtain an equidistant pattern in the production direction of the profile product. The pulling and stretching device can further be used to guide the final product in the width and/or height direction during its transition from final product to profile product in order to control bending.

The pulling and stretching device can be any type of device that comprises means for gripping the material and means for pulling. According to one example, the pulling and stretching device comprises controlling means for controlling the pulling force applied to the material. The controlling means may comprise sensor(s) and/or may be connected to sensor(s) that supervises the state of the final profile and/or the material during its transition from the final profile to the profile product. The sensor(s) comprises means for sending analog and/or digital information to the controlling means. The information relates to the state of the material and the controlling means is configured to process the information for controlling the pulling and stretching device.

This enables good precision in distance between three dimensional-longitudinal features of profile, e.g. teeth in a pinion rack, making it possible to stretch profile so that high equidistant precision between teethes in a pinion rack or teethed belt becomes possible.

This also enables a possibility to design the rotating die so it results in profile product that deliberately has a slightly shorter distance between three dimensional features, before stretching and gives room for stretching/pulling calibration.

The invention also refers to a method for producing a profile product by use of a device according to any one of the examples above, wherein the method comprises feeding a material to the first channel section and forming the same into the master profile in the first channel section, feeding a second material to the first channel section and forming the same into a master profile in the first channel section or feeding a second material to the second channel section, feeding the material further to the second channel section and forming the same into the final profile in the second channel section.

transforming the final profile into the profile product.

According to one example, the final profile and/or the profile product is stretched for achieving the same distance in the pattern along the production direction, i.e. to achieve equal distance between elevations and/or indentations in the pattern along the production direction.

BRIEF DESCRIPTION OF THE DRAWINGS

The invention will below be described in connection to a number of drawings, wherein;

FIG. 4 schematically shows an enhanced portion of the rotating die and the final profile in any of FIGS. 2B-2D;

FIG. 4A schematically shows an enhanced portion of a final profile in FIG. 4;

FIG. 4B schematically shows an enhanced portion of a rotating die in FIG. 4;

FIG. 12 schematically shows a perspective view of an assembly according to FIG. 11, and wherein;

FIG. 13 schematically shows a cross-section side view of a co-extrusion device and/or an on-extrusion device according one example;

FIG. 14 schematically shows a perspective view of a co-extrusion device and/or an on-extrusion device according one example;

FIG. 15 schematically shows a cross-section side view of a co-extrusion device and/or an on-extrusion device according one example;

FIG. 16 schematically shows a cross-section side view of a co-extrusion device and/or an on-extrusion device according one example where the device comprises two opposing rotating dies;

FIG. 17 schematically shows a cross-section side view of a co-extrusion device and/or an on-extrusion device according one example comprising one rotating die 3;

FIG. 18 schematically shows an example where the first inlet channel conveys a continuous solid material in the form of a wire or the like, and a material to be extruded or pultruded in the first and second channel sections, and where;

DETAILED DESCRIPTION

The invention will below be described in connection to a number of drawings. Same features will be denoted with like numbers in all the drawings.

Here, front view with inlet and back view with outlet are used as an orientation for the reader with regard to production direction where material to be worked is inserted into the inlet and a profile product is shaped in the device and then exits the device via the outlet.

In some drawings, the production direction is denoted PD with an arrow pointing in the production direction.

Figure 1:
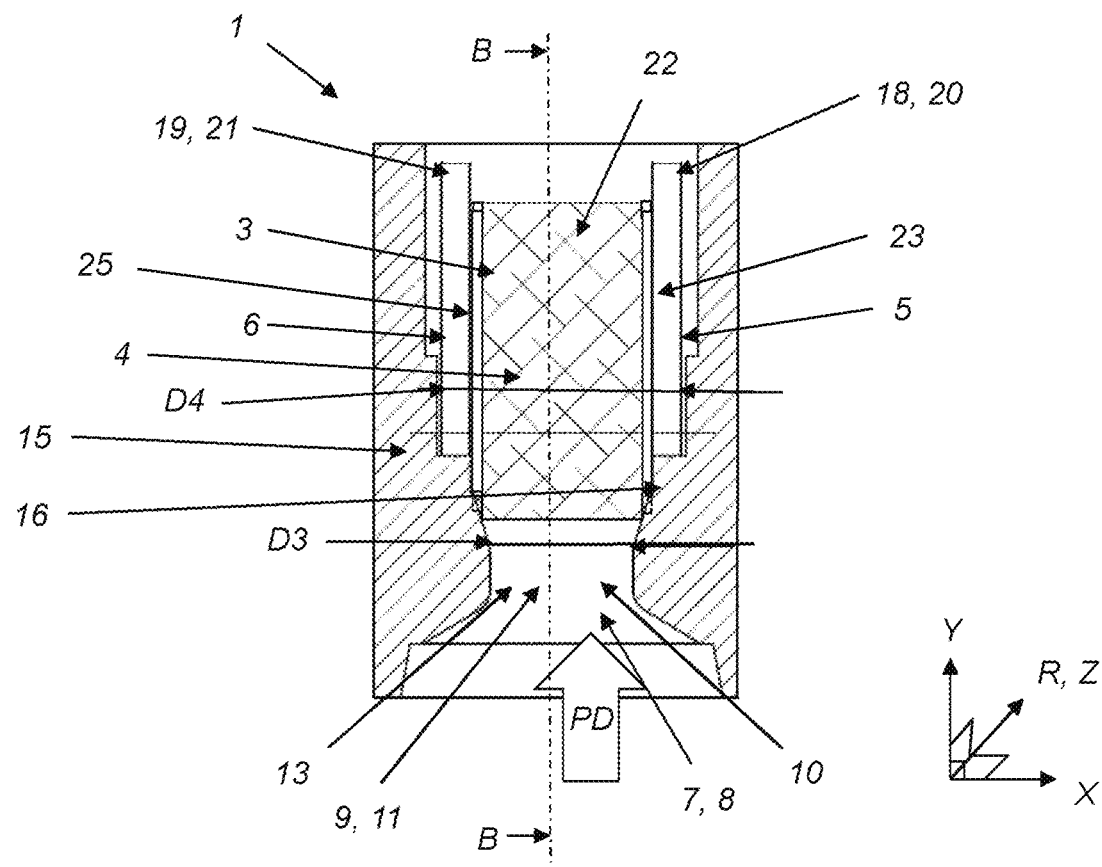
FIG. 1 schematically shows a cross-sectional view from below along section A-A in FIG. 2 of a device according to one example of the invention.
Figure 2:
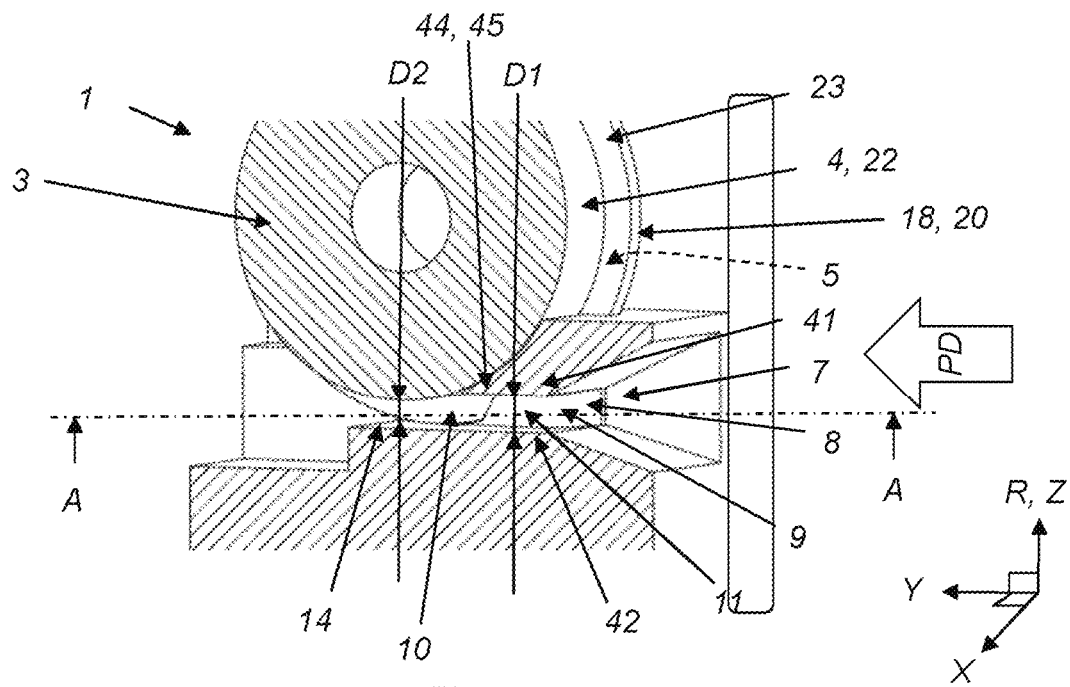
FIG. 2 schematically shows a cross-sectional perspective side view of a device according to the invention.

FIG. 1 schematically shows a view from below along section A-A in FIG. 2, i.e. in a height direction Z, of a device according to one example of the invention and FIG. 2 schematically shows a cross-section perspective view of the device in FIG. 1. FIGS. 1 and 2 show an extrusion or pultrusion device 1, 1a for extrusion or pultrusion in a production direction Y of a profile product 2, see FIGS. 2A-2D and FIGS. 4, 4A, 4B, 7 and 8, made from a plastically deformable material and/or made from a viscoelastic material and/or plastically deformable material with elastic property and/or viscoplastic material with elastic property.

The device comprises:
 a rotating die 3, extending in a radial R direction and a width direction X, having two opposite first and second side walls 5, 6 and an outer circumferential surface 4 extending in the width direction X there between, wherein the rotating die 3 comprises a first side portion 23 in connection to the first side wall 5 and a second side portion 25 in connection to the second side wall 6 and a mid-portion 22 extending between the first and second side portions 23, 25,
 and
 a profile definition zone 7 having a longitudinal direction Y coinciding with the production direction Y, a height direction Z and a width direction X being perpendicular to the height direction Z, comprising a through channel 8 comprising a first channel section 9 followed by a second channel section 10 downstream the first channel section 9 with reference to the production direction, wherein the rotating die 3 is rotatable about an axis extending across the production direction Y and arranged to allow the outer circumferential surface 4 to, while the rotating die 3 rotates, exert a pressure onto a surface of the material when fed through the profile definition zone 7, and wherein;
 the first channel section 9 is circumferentially delimited by one or more walls 11 and wherein the second channel section 10 is circumferentially delimited by
 the circumferential surface 4 of the rotating die 3 and a channel portion 13 comprising
 a counter-bearing 14, shown in FIG. 2, opposite the rotating die 3 and
 opposing first and second channel portion side walls 15, 16 between the rotating die 3 and the counter-bearing 14.

According to an example embodiment, FIGS. 1, 2, 2A-2D schematically show that the first channel section 9 is configured to deform the material into a master profile 36 having a maximum height H1 at a predetermined feeding rate dependent on material and minimum cross-sectional area with a first maximum height D1 in the first channel section 9 when exiting the first channel section,
 wherein the first channel section 9 comprises a wake element 58 having a predetermined height D5 dependent on the elastic property of the material,
 wherein the wake element 58 is positioned in at least the height direction Z,
 and wherein the second channel section 10 is configured to further deform the material into a final profile 37 having a minimum height H2 by the rotating die 3 being configured to apply increasing pressure on the master profile 36 against the counter-bearing 14 when the master profile 36 exits the first channel section 9,
 wherein the rotating die 3 is configured at a minimum distance D2 between the rotating die 3 and the counter-bearing 14 dependent on a maximum allowable pressure applied by the rotating die 3 at the position of that minimum distance D2, wherein the maximum allowable pressure corresponds to the maximum difference in height of the master profile 36 and the final profile 37 and dependent on pattern 38 in the circumferential surface 4 of the rotating die 3,
 and dependent on the elastic property of the material and thus difference between the height H3 of the final profile and the profile product due to the elasticity of the material.

According to one example, the first channel section 9 comprises at least two side walls 11 in the form of a top pre-bearing 41 and an opposing bottom pre-bearing 42, wherein the top pre-bearing 41 is arranged over the opposing bottom pre-bearing 42 in the height direction Z, wherein the top pre-bearing 41 and/or the bottom pre-bearing 42 comprises the wake element 58.

According to one example, the wake element protrudes in a direction from the side wall into the first channel section. According to one example, the wake element protrudes in the height direction from the side wall into the first channel section One advantage here is that maximum load is controlled in both the first and second channel section which gives the possibility to design the extrusion and/or pultrusion device dependent on material to be processed and process speed. Controlling the maximum load dependent on material to be processed allows for a production rate with high quality output and reduces risk for e.g. rupture due to a too high stress on the material.

Figure 2A:
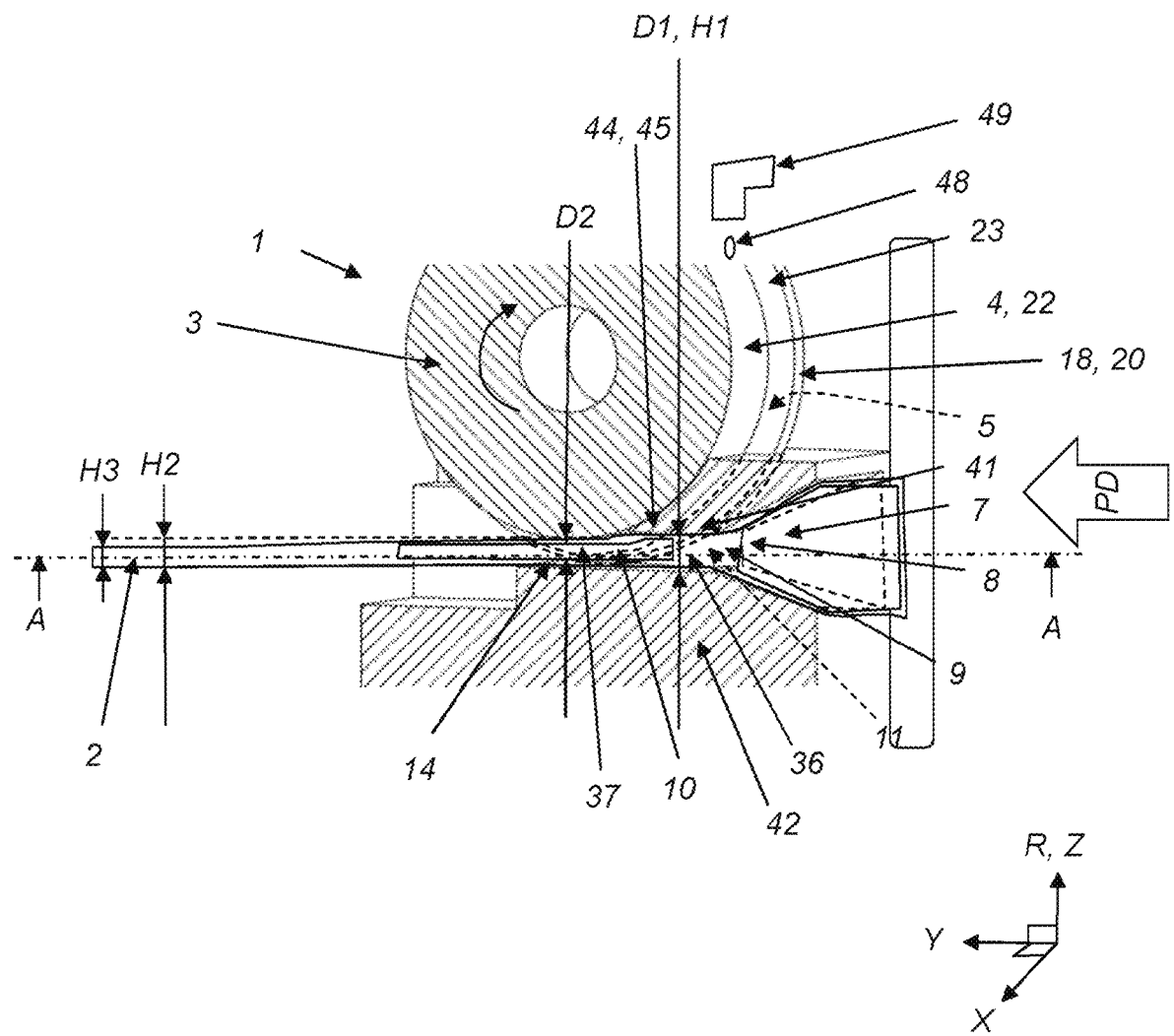
FIG. 2A schematically shows a similar view as FIG. 2, but including a material processed.
Figure 2B:
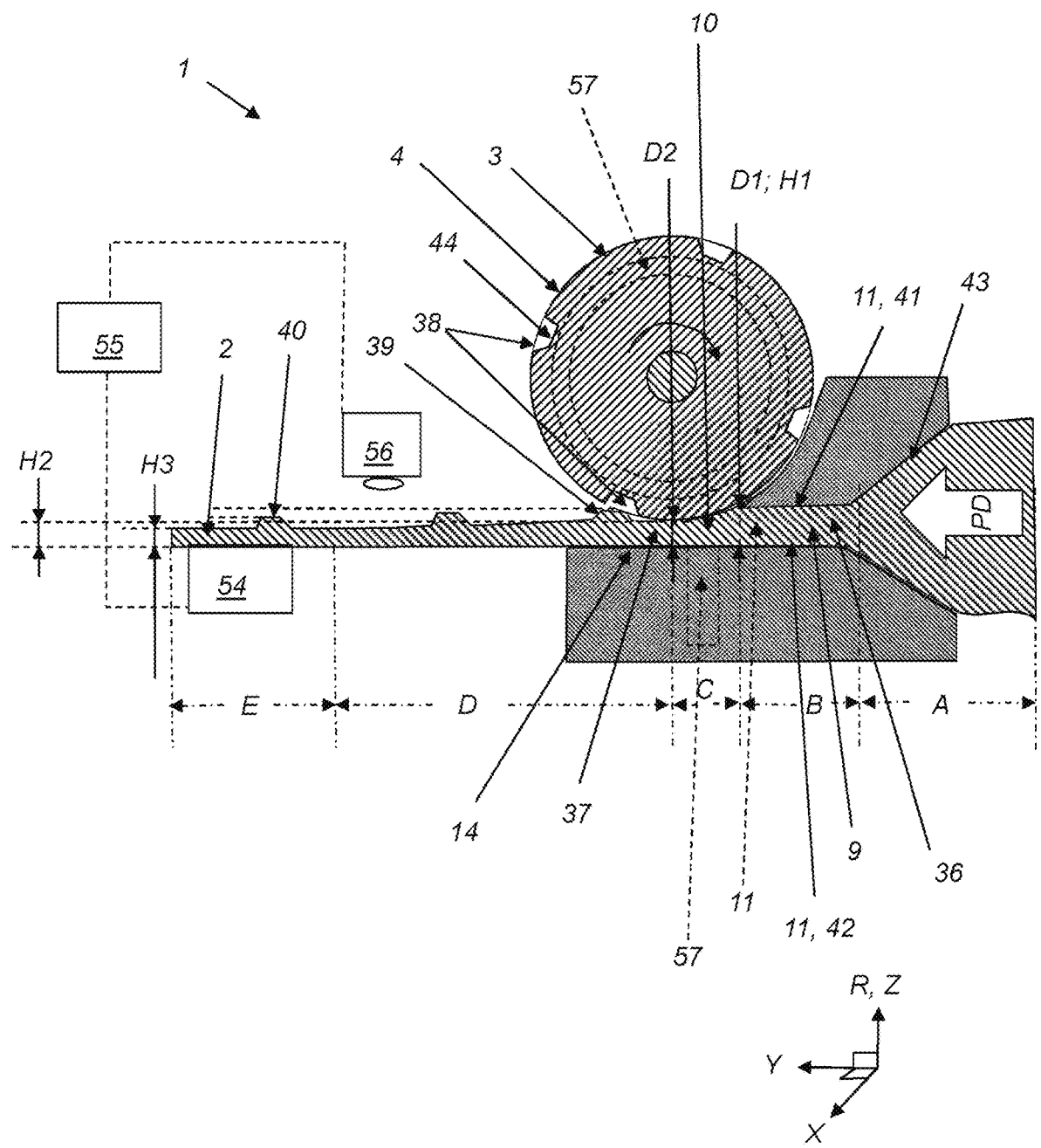
FIG. 2B schematically shows a side view along cross-section B-B in FIG. 1 according to one example.
Figure 2C:
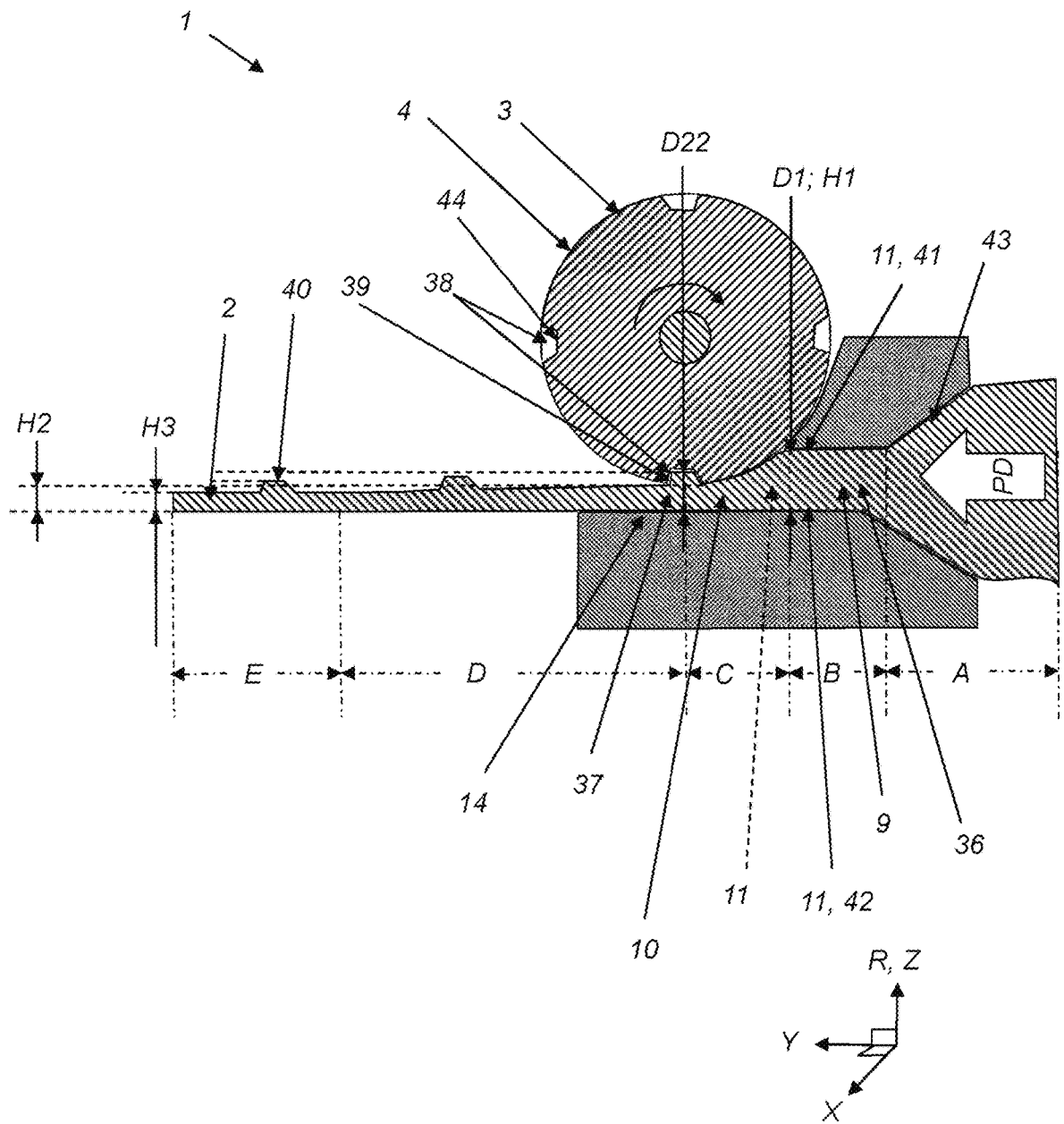
FIG. 2C schematically shows a side view along cross-section B-B in FIG. 1 according to one example.
Figure 2D:
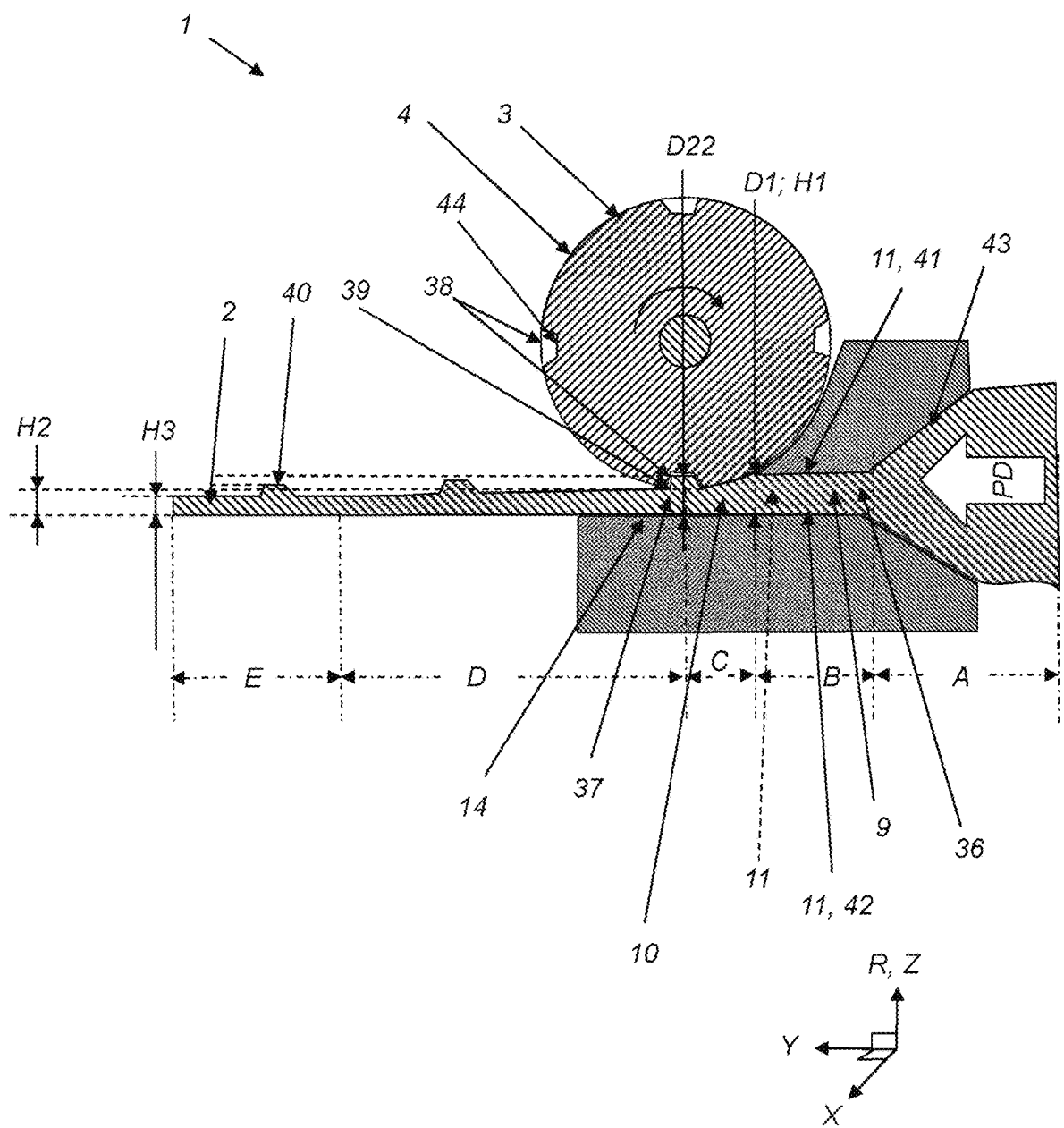
FIG. 2D schematically shows a side view along cross-section B-B in FIG. 1 according to one example.

FIG. 2A schematically shows a similar view as FIG. 2 and that the material is formed in the first channel section 9 into the master profile 36 and directly thereafter formed in the second channel section 10 into the final profile 37. FIG. 2A also shows that the final profile 37 has a lesser height H1 than the height H2 of the master profile 36 due to further pressure on the master profile 36 in the second channel section 10. FIG. 2A also shows that the product profile 2 has a lesser height H3 than the height H1 of the final profile 36 due to shrinking when cooling down from the final profile 37 to the product profile 2. In FIG. 2A the rotating die lacks indentions 38 as shown in FIGS. 2B-2D. Comparing FIGS. 2B-2D with FIG. 2A, the rotating die 3 in FIG. 2A could be seen, as shown in FIG. 2B, as being rotated such that the part of the rotating die 3 pressing against the material against the counter-bearing 14 lacks indentations 38 and thus exerts maximum pressure against the material.

FIG. 2B schematically shows a side view along cross-section B-B in FIG. 1 and is similar to FIG. 2A, but the rotating device is rotated such that the part of the rotating die 3 pressing against the material against the counter-bearing 14 does not comprise an indentation 38. FIGS. 2C and 2D show a similar device 1, 1a as FIG. 2B, but where the rotating die 3 is rotated such that the indentation 38 with a bottom 44 faces the counter bearing 14.

FIG. 2B schematically shows an initial zone A where the material is pressed by a device (not shown) into the first channel section 9 either by a device (not shown) exerting an external pressure in the production direction, i.e. extrusion, and/or by the material being dragged through the first channel 9 by a device (not shown) dragging the material in the production direction PD, i.e. pultrusion. Zone A of the device comprises a funnel shaped opening 43 where the material changes form from an initial form having a larger cross-section that the first channel section 9. The shape of the opening can, however, vary depending on material, temperature and device pressing the material.

FIG. 2B schematically shows a zone B arranged directly after zone A, wherein zone B correspond to the first channel section 9 and where the formation of the master profile 36 takes place due to the material changing form due to the pressure exerted on the material from the side walls 11 in the first channel section 9 when the material moves through the first channel section 9.

FIG. 2B schematically shows a zone C arranged directly after zone B, wherein zone C correspond to the second channel section 10 and where the formation of the final profile 36 takes place due to the material changing form due to the pressure exerted on the material from at least the rotating die 3 and the opposing counter bearing 14 in the second channel section 10 when the material moves through the second channel section 9.

FIG. 2B schematically shows a zone D arranged directly after zone C, wherein zone D correspond to a section of the production line after the second channel section 10 and where the material starts to cool down and where the final profile 36 starts to change form due to shrinking as a consequence of the temperature drop. In zone D, the final profile 37 can be subject to various production measures for achieving desired material properties. For example, cooling, heating, stretching, compressing, etc. in order to change the final profile 37 into a profile product 2 with desired material properties.

The length of Zone D depends on material properties and a working environment surrounding the material in zone D. The material properties are e.g. heat dissipation and the mass of the material to be cooled down. For example, a thinner material cools down faster than a thicker material. The working environment refers e.g. to ambient temperature and humidity. For example, a warmer environment slows down the cooling process compared to a cooler environment.

FIG. 2B schematically shows a zone E arranged after zone D, wherein zone E correspond to a section of the production line where the material has cooled down to a predetermined temperature representing a temperature establishing the final form of the product profile and where no or an infinitesimal change of form will continue. FIG. 2B, shows that the profile product has a height H3 in Zone E being less than the height H2 of the final profile 37. In the same manner, the pattern 39 of the final profile 37 has shrunk to a pattern 40 in zone E due to the cooling.

FIG. 2B shows an example, where the device 1, 1a according to any of the examples above comprises a pulling and stretching device 54 arranged downstream the second channel section 10 and configured to pull the material in the production direction PD when exiting the second channel section 10 for transforming the final profile 37 to the profile product 2.

One advantage is that the pulling and stretching device dynamically can stretch the material in the final profile during its transition to profile product, e.g. in order to obtain an equidistant pattern in the production direction of the profile product. The pulling and stretching device can further be used to guide the final product in the width and/or height direction during its transition from to final product to profile product in order to control bending.

According to one example, the distance between indentations 38 in the pattern 38 on the rotating die 3 is less than a distance between elevations 40 in the corresponding pattern 38 in the production direction on the profile product 2, wherein the pulling and stretching device 54 is configured to stretch the final profile 37 and/or the profile product 2 so that high precision in distance between features on profile can be achieved by adjustment stretching.

The pulling and stretching device can be any type of device that comprises means for gripping the material and means for pulling. According to one example, the pulling and stretching device comprises controlling means 55 for controlling the pulling force applied to the material. The controlling means 55 may comprise sensor(s) and/or may be connected to sensor(s) 56 that supervises the state of the final profile and/or the material during its transition from the final profile to the profile product. The sensor(s) comprises means for sending analog and/or digital information to the controlling means. The information relates to the state of the material and the controlling means is configured to process the information for controlling the pulling and stretching device. In FIG. 2B, the rotating die 3 and/or the counter-bearing 14 comprises a cooling device 57 that cools down the material when forming the final profile 37. This has the advantage that a predetermined temperature of the material is achieved for optimum material properties of the profile product. The material temperature when extruding and/or pultruding can for certain materials be crucial for the quality of the profile product. The temperature is also important due to frictional properties between the material and the rotating die and/or the counter-bearing. The cooling device can, for example, be arranged in the form of cooling circuits with gas or liquid fluid conductors arranged within the rotating die and/or the counter-bearing; and/or external devices cooling down the rotating die and/or the counter-bearing; and/or liquids or gaseous fluids added to the rotating die and/or the counter-bearing; or a combination of such devices or any other suitable cooling devices. It should be noted, that rotating die 3 can be configured to operate without the cooling device 57 in FIG. 2B, as is shown in e.g. FIGS. 2C-2D.

According to one example, the rotating die 3 is configured to be cooled on the surface so that the temperature of the rotating die surface is below a predetermined allowed temperature of the extruded material.

According to one example, the rotating die is cooled on the surface so that the temperature of the rotating die surface is at least 10 degrees Celsius below a glass transition temperature or melting temperature of the material.

According to one example, the rotating die is cooled on the surface so that the temperature of the rotating die surface is at least 50 degrees Celsius below a glass transition temperature or melting temperature of the material, enabling higher speed of extruding.

FIGS. 2B-2D schematically show that the rotating die 3 comprises a pattern 38 comprising at least one indentation 38 in the circumferential surface 4. In FIGS. 2B-2D, the pattern 38 comprises 4 indentations, but the number of indentations is here only an illustrative example and there may be more or less indentation in a pattern spread over the rotating die in a predetermined design depending on the desired features of the profile product 2. The indentations can have any shape suitable, for example oval, round, polygon or a mixture of such or other shapes. The indentations 38 have a bottom 44 at a maximum depth of the indentation and the indentations may have different or similar depths. Between the indentations 38 the rotating die comprises portions that have a minimum distance D2 between the rotating die 3 and the counter bearing 14 when facing the counter-bearing 14. The indentation 38 with the largest distance between the bottom 44 and the counter-bearing 14 when facing the counter-bearing forms a maximum distance D22, see FIGS. 2C and 2D, between the rotating die 3 and the counter-bearing 14.

According to one example, the minimum distance D2 in the height direction Z between the circumferential surface 4 and the counter-bearing 14 in the second cross-section 17 is less than a maximum distance D1 in the height direction in the first cross-section 12.

FIGS. 2C and 2D schematically shows the same side view as FIG. 2B with Zones as described above, but with the rotating die 3 being rotated such that one indentation 38 faces the counter-bearing 14.

FIGS. 2C and 2D schematically show that the rotating die 3 is configured at a maximum distance D22 between a bottom 44 of the indentation 38 and the counter-bearing 14 dependent on a minimum allowable pressure applied by the rotating die at the position of that maximum distance D22 for achieving plastic deformation of the material in the indentation 38.

FIGS. 2B-2D, schematically shows that, the pattern 38 in the rotating die 3 is configured to be sized with regard to a shrinking effect of the final profile 37 cooling down to the profile product 2.

It should be noted that the pattern 38 in the rotating 3 could be arranged such that the device 1, 1a simultaneously exhibits the minimum distance D2 and the maximum distance D22 if the pattern 38 is arranged such that the indentation is positioned in the circumferential surface 4 with surrounding portion(s) of the circumferential surface 4, at least in the width direction X, comprising no indentations when facing the counter-bearing 14. As an alternative the pattern 38 comprises a number of indentations 38 spread in the width direction X with such non-indentation portions between them facing the counter-bearing 14 at the same time. Here, the rotating die 3 exerts both maximum pressure in the non-indentation portion due to the minimum distance D2 and minimum pressure in the indentation due to the minimum distance D22 during at least a short time interval. The design choice of maximum pressure and minimum pressure further allows for an optimized form change of the master profile to the final profile dependent on material such that the material in the indentation fills the indentation and becomes deformed at the same time as the material between the outermost parts, in the radial direction, of the rotating die does not exceed the maximum pressure allowed for the material and/or the design of the extrusion and/or pultrusion device. It should further be noted that some materials exhibit properties that allows for easy filling of the indentations due to the initial pressure difference between the inside and the outside of the indentation. When the indentation is filled a steady state condition, with regard to pressure difference, is achieved during a short time period. In such steady state condition the pressure in the material is balanced and the pressure difference is minimized. For some materials the pressure could be equal or essentially equal in both the indentation and the surrounding non-indentation part during that part of the operation when the indentation faces the counter bearing and the indentation is filled.

It should also be noted that the rotating die can have a different circumferential distance between the indentations 38 than what is given in the finished profile product should it be rolled up around the rotating die, allowing for compensation and adjusting distance between features to get high precision on finished profile product by e.g stretching the final profile after extrusion.

FIG. 2C schematically shows that an upper portion 41, also called pre-bearing 41 below, of the wall 11 in the first channel section 9 is arranged at a height level in the Z-direction above a maximum height level of the bottom 44 of the indentation 38 when the indentation 38 faces the counter-bearing 14. FIG. 2D schematically shows that the upper portion 41 of the wall 11 in the first channel section 9 is arranged at a height level in the Z-direction below a maximum height level of the bottom 44 of the indentation 38 when the indentation 38 faces the counter-bearing 14. The height level of the upper portion 41 can vary dependent on material and on the pattern 38 in the rotating die 3 and thus how the material changes form to fill the indentation 38 with the plastic deformation.

FIGS. 2A to 2I schematically show that the first channel section 9 comprises side walls 11 in the form of a top pre-bearing 41 and an opposing bottom pre-bearing 42. The top pre-bearing 41 is arranged over the opposing bottom pre-bearing 42 in the height direction Z.

Figure 2E:
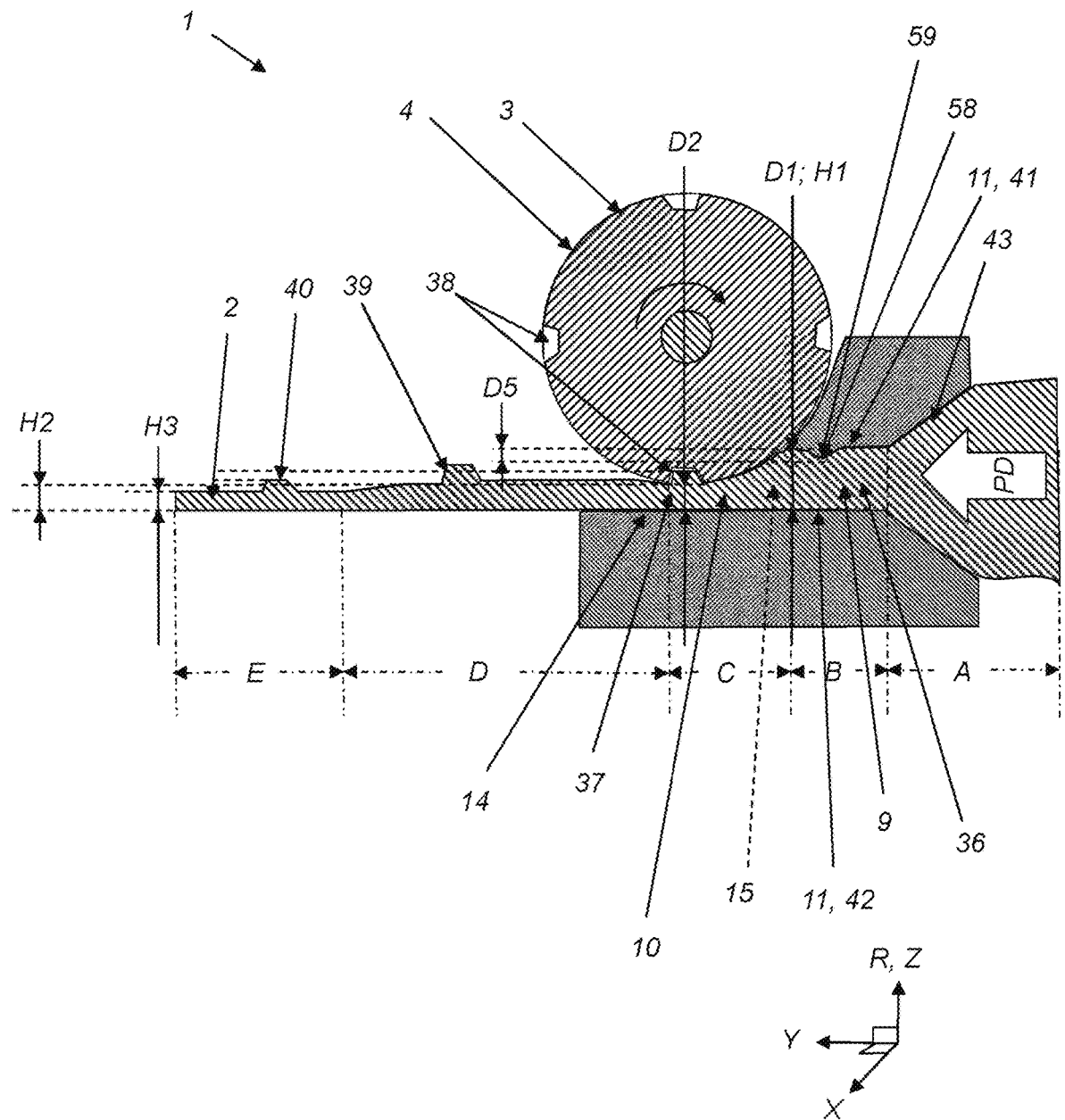
FIG. 2E schematically shows a side view along cross-section B-B in FIG. 1 according to one example.

FIG. 2E schematically shows one example embodiment where the top pre-bearing 41 comprises the wake element 58.

Figure 2F:
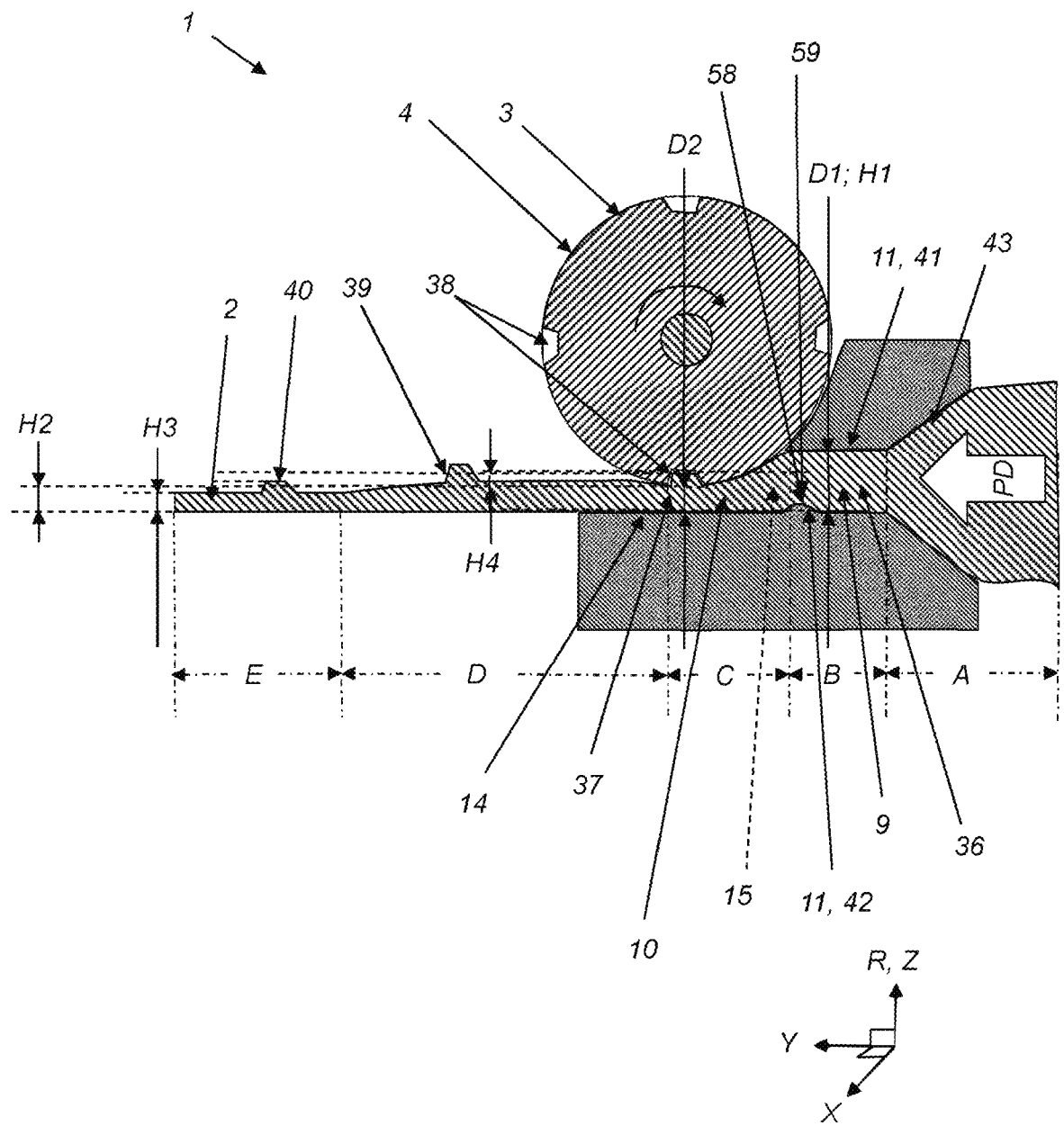
FIG. 2F schematically shows a side view along cross-section B-B in FIG. 1 according to one example.

FIG. 2F schematically shows one example embodiment where the bottom pre-bearing 42 comprises the wake element 58.

Figure 2G:
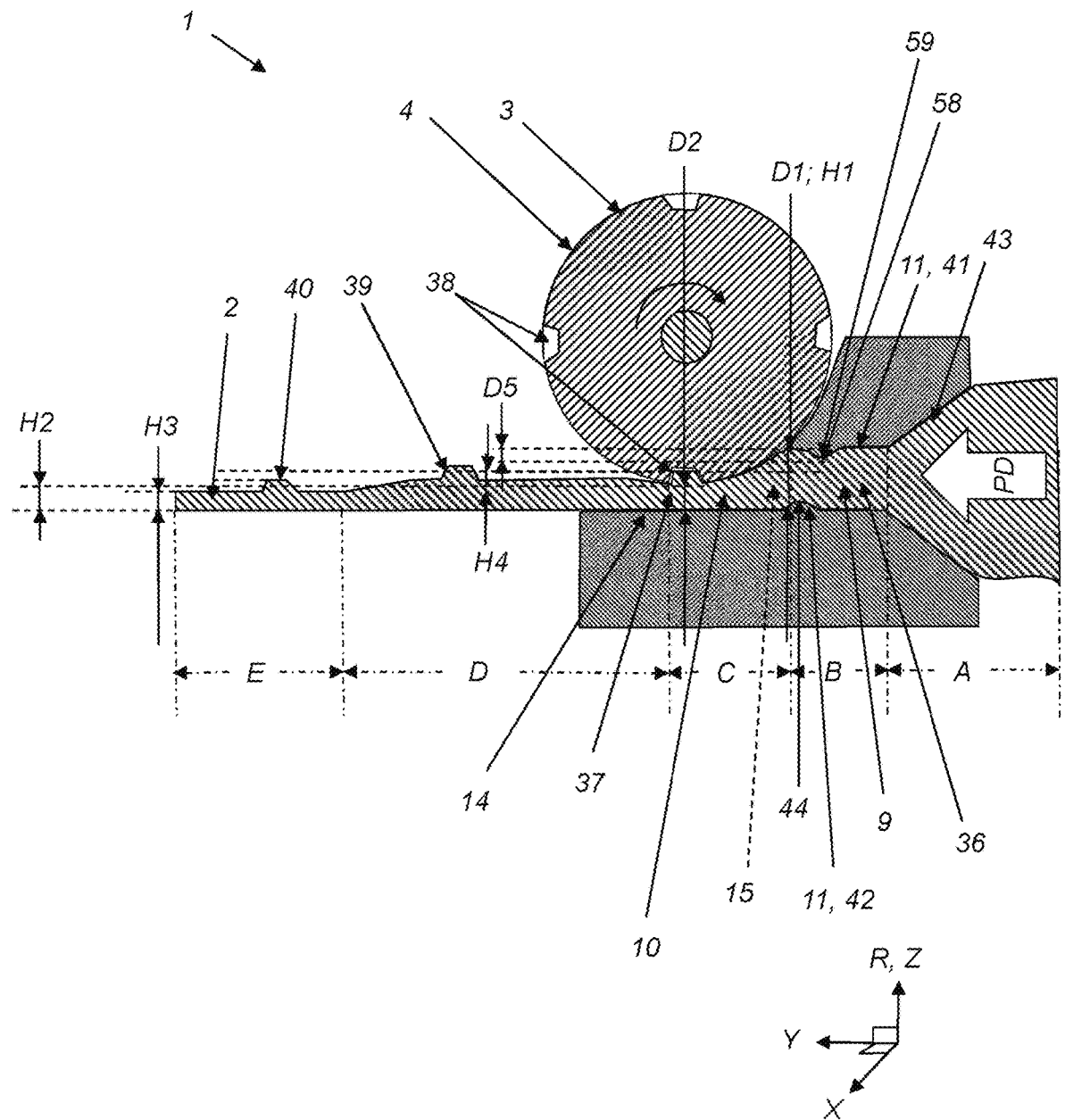
FIG. 2G schematically shows a side view along cross-section B-B in FIG. 1 according to one example.

FIG. 2G schematically shows one example embodiment where the bottom pre-bearing 42 and the top pre-bearing 41 comprise the wake element 58.

In FIGS. 2E-2G, the wake element 58 is arranged at a predetermined distance upstream in the production direction PD from where the first channel section 9 transitions into the second channel section 10.

Figure 2H:
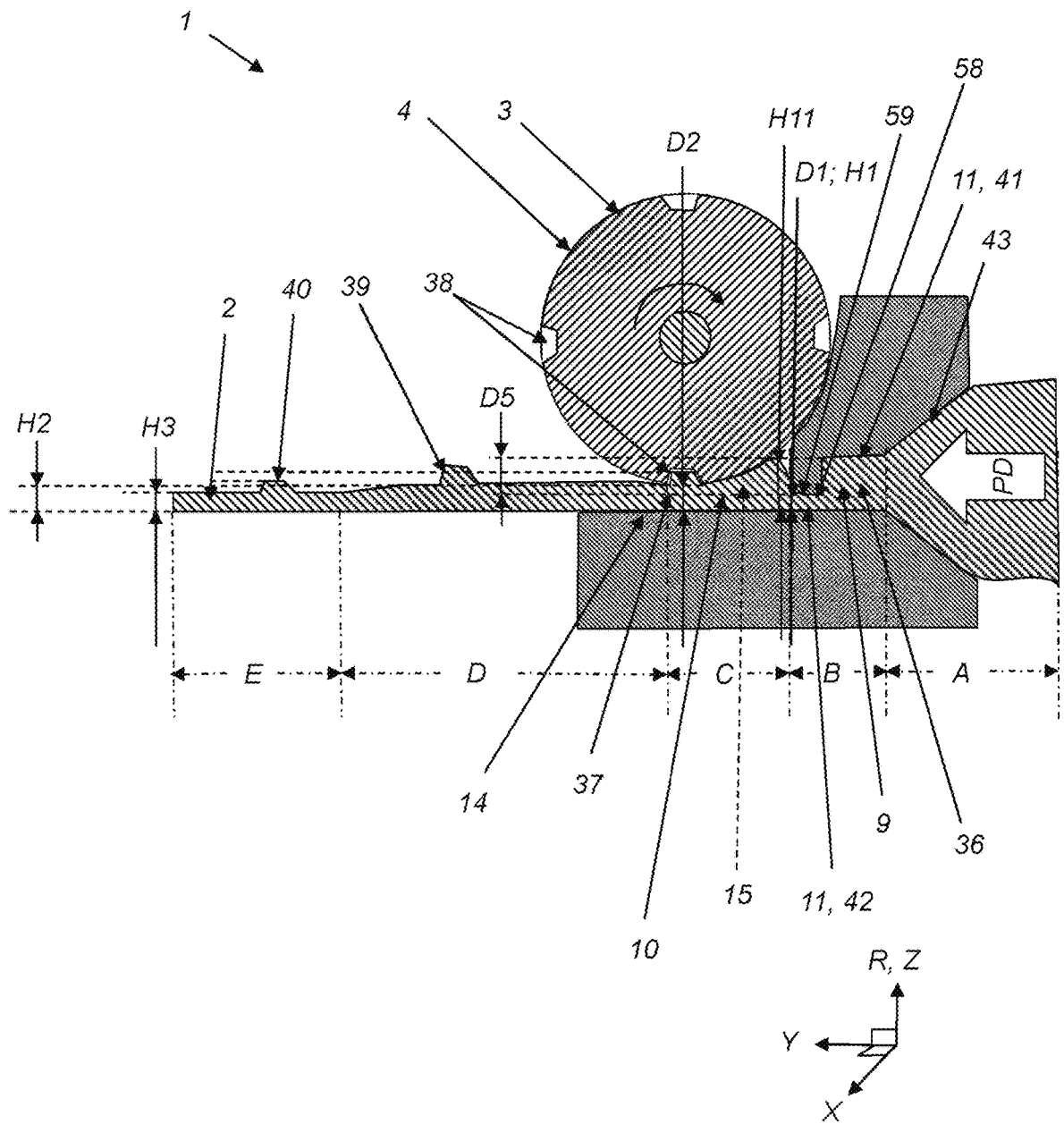
FIG. 2H schematically shows a side view along cross-section B-B in FIG. 1 according to one example.
Figure 2L:
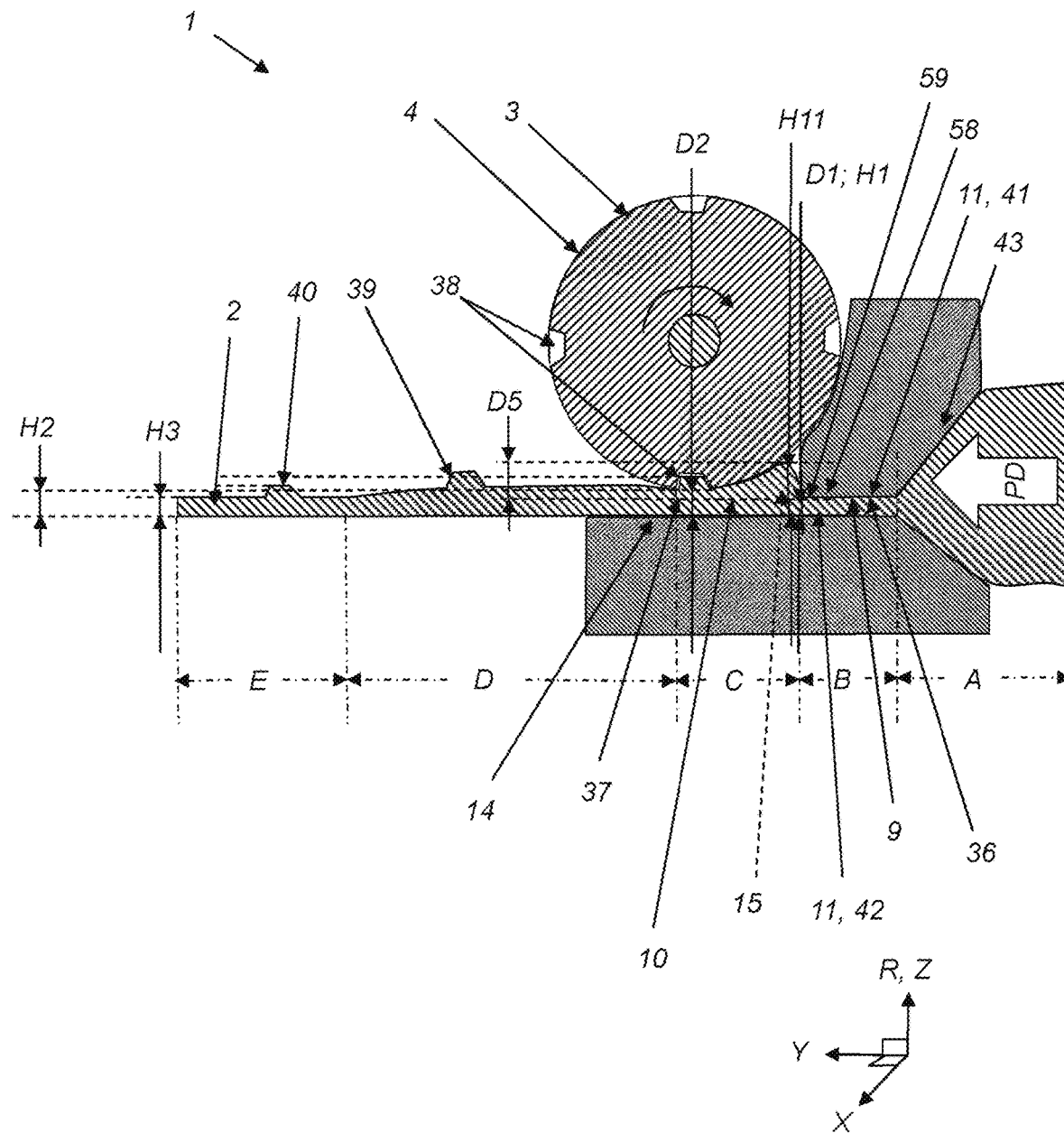
FIG. 2I schematically shows a side view along cross-section B-B in FIG. 1 according to one example.

FIG. 2H schematically shows one example embodiment where the wake element 58 is arranged where the first channel section 9 transitions into the second channel section 10, wherein the wake element 58 comprises an upper edge 59 with a lowest part, in the height direction Z, wherein the upper edge 59 delimits an upper portion, in the height direction Z, of the wake element 58 in the first channel section 9 where the first channel section 9 transitions into the second channel section 10. In FIG. 2H the wake element 58 is a protrusion in the first channel section with the upper edge 59 facing the bottom pre-bearing 42.

FIG. 2I schematically shows one example embodiment where the wake element 58 is arranged where the first channel section 9 transitions into the second channel section 10, wherein the wake element comprises an upper edge 59 with a lowest part, in the height direction Z, wherein the upper edge 59 delimits an upper portion, in the height direction Z, of the wake element 58 in the first channel section 9 where the first channel section 9 transitions into the second channel section 10. In FIG. 2I the wake element 58 is arranged as being the entire top pre-bearing in the first channel section with the upper edge 59 facing the bottom pre-bearing 42.

FIGS. 2H and 2I show that the wake element 58 protrudes to a height level Z being below the lowest point of the circumferential surface 4, i.e. where the distance D2 is at its minimum. In FIG. 2I, the height D5 of the wake element 58 is determined by the difference between the maximum height H11 of the master profile 36 in the second channel section 10, and the position in the height direction Z of the upper edge 59 of the wake element 58. In FIGS. 2E-2H, the height D5 of the wake element 58 is determined by the difference between the maximum height D1 of the first channel section 9 and the position in the height direction Z of the upper edge 59 of the wake element 58. However, in FIG. 2H the height D5 of the wake element 58 can alternatively be determined by the difference between the maximum height H11 of the master profile 36 in the second channel section 10, and the position in the height direction Z of the upper edge 59 of the wake element 58. FIGS. 2B-2D shows that the top pre-bearing 41 is positioned at a height level in the height direction Z being above the lowest point of the circumferential surface 4, i.e. where the distance D2 is at its minimum. Here, the calculation of the height D5 of the wake element 58 can be calculated according to the above dependent on the position of the wake element 58 and the elastic property of the material.

The cross-section of the first channel section 9 is configured to be sized with regard to the elastic properties of the material and a shrinking effect of the final profile Y2 cooling down to the profile product 2 having a final height H3. Hence, the height D5 of the wake element 58 is dependent on at least the elastic properties of the material.

The pattern in the rotating die 3 is configured to be sized with regard to the elastic properties and a shrinking effect of the final profile 37 cooling down to the profile product 2.

According to the examples in FIGS. 2B-2I the master profile height H1 when exiting the first channel section 9 is less than or equal to a master profile height H11 in the second channel section 10 before reaching the rotating die 3 due to elasticity.

As mentioned above, the relative position of the upper edge 59 and the lowest point of the rotating die 3 can vary dependent on the elastic property of the material for all the examples in FIGS. 2E-2I. In FIGS. 2B-2G the upper edge 59 of the wake element is, in the height direction Z, positioned above the lowest point of the rotating die 3 and in FIGS. 2H-2I the upper edge 59 of the wake element is, in the height direction Z, positioned below the lowest point of the rotating die 3.

According to one example, the cross-section area A1 of the second channel section 10 is configured to be sized with regard to a shrinking effect of the final profile 37 cooling down to the profile product 2 having a final height H3.

According to one example embodiment, FIG. 1 schematically shows that the width D3 of the first channel section 9 is, at least along a portion of its length and at least along a portion of its height, less than a distance D4 between the two opposite side walls 5, 6 of the rotating die 3. Hence, the first channel section 9 should be at least smaller in width than a distance between the opposing first and second channel portion side walls 15, 16 in the second channel section 10. The difference in width between the first channel section 9 and the second channel section 10 depends on features of the first and second side portions 23, 25 and tolerance between the rotating die 3 and the respective opposing first and second channel portion side walls 15, 16. The width D3 of the first channel section 9 should be less than a distance D4 being the distance between the opposing first and second channel portion side walls 15, 16 minus the sum of tolerances, i.e. the sum of the gap between the rotating die side walls 5, 6 and the respective opposing first and second channel portion side walls 15, 16 in the second channel section 10. If the first and second side portion comprises flange portions 18, 19, see below for further explanation, then the width D3 of the first channel section 9 is, at least along a portion of its length and at least along a portion of its height, less than a distance D4 between the two flange portions 18, 19.

Figure 5:
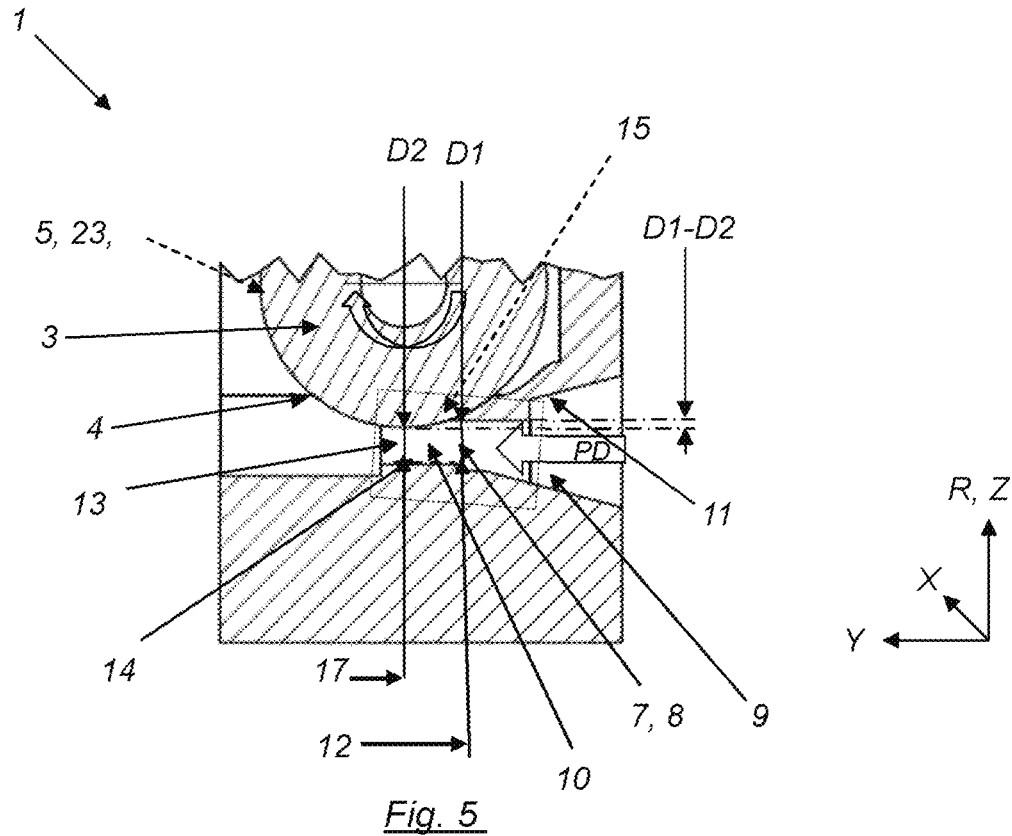
FIG. 5 schematically shows a cross-sectional side view of a device according to one example of the invention FIG. 6 schematically shows a perspective back view and outlet of a device according to one example of the invention.

One advantage is that a local pressure reduction is achieved in connection to the first and second outer edge portions 5, 6 due to the geometrical difference in the first and second channel sections 9, 10. The local pressure reduction reduces the flow speed of the material and this removes leakage problems between the first side wall 5 and the first and the first channel portion side wall 15; and between the second side wall 6 and the second channel portion side wall 16. This will be explained further below and also in combination with additional leakage protection strategies. FIG. 1 shows one example of an additional and FIG. 5 shows another example of leakage protection strategies. The different examples can be combined, which will be explained further below.

It should be noted that the rotating die 3 can be cylindrical or non-cylindrical and textured or not textured dependent on desired profile of the profile product.

Figure 3A:
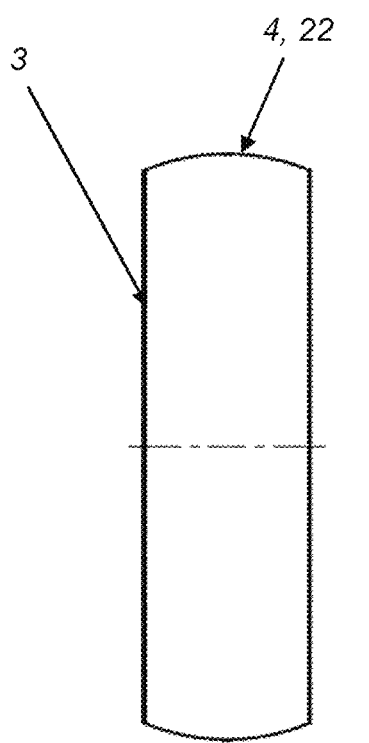
FIG. 3A schematically shows a front view of a rotating die according to one example.
Figure 3B:
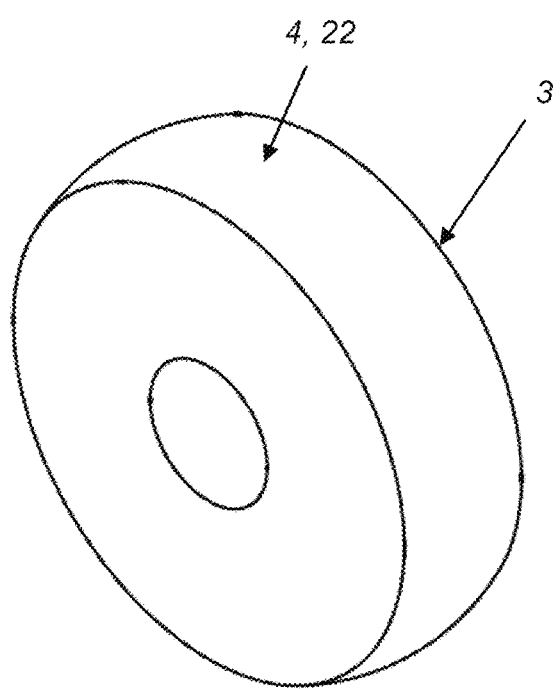
FIG. 3B schematically shows a perspective view of a rotating die according to one example.

According to one example shown in FIGS. 3A and 3B, the rotating die 3 may be configured, before forming the profile product 2, to alter form during forming of the final profile 37 dependent on the maximum allowable pressure. In FIGS. 3A and 3B, at least a mid-portion 22 of the circumferential surface 4 of the rotating die 3 is convex in order to allow bending due to, at least, the forces and temperature during steady state production so that a predicted pattern 39 can be achieved in the final profile 37 during the steady state operation. Here, steady state operation refers to stable operating conditions after a start-up procedure.

According to one example (not shown), the counter-bearing 14 is configured, before forming the profile product 2, to alter form during forming of the profile product 2 dependent on the maximum allowable pressure. According to one example (not shown), also the top pre-bearing 41 and/or the bottom pre-bearing 42 can be configured in a similar manner to change form a start-up procedure to a steady state operation.

According to one example shown in FIGS. 4, 4A and 4B, the rotating die 3 is configured with a pattern 38 with at least one indentation 38 with a bottom 44, wherein each indentation 38 comprises a release angle a2 compared to a release angle a1 of the corresponding elevation in the pattern 39 in the final profile 37. The release angles a1 and a2 are dependent on the radius of the rotating die 3, the intended pattern 39 in the final profile 37, the configuration of the counter bearing and travelling speed of the final profile 37.

However, a1 is greater than a2 dependent on radius of the rotating die 3 and type of pattern 38 in the rotating die 3.

FIGS. 4, 4A and 4B show that the indentation 38 in the pattern 38 has a height D23, alternatively called depth, in the radial direction R from the bottom 44 of the indentation 38 to the indentation delimiting portion in the circumferential surface 4 of the rotating die 3. The height D23 plus the distance D2 in FIG. 2B is equal to the maximum distance D22 in FIGS. 2C and 2D and is thus relevant for the minimum allowable pressure for achieving plastic deformation of the material in the indentation 38. FIG. 4A further shows that the pattern 39 in the final profile has an elevation with a height H4 that correspond to the depth D23 between the bottom 40 of the indentation 38 and the circumferential outer most portion of the rotating die 3.

In FIG. 1 the first side portion 23 comprises a first flange portion 18 extending in a radial direction R with an extension exceeding the radial extension of at least a part of the mid-portion 22 and wherein the second side portion 25 comprises a second flange portion 19 extending in the radial direction with an extension exceeding the radial extension of at least a part of the mid-portion 22.

The first flange portion 18 and the second flange portion 19 are arranged to prevent movement of the material outside the rotating die 3 in a direction towards the opposing first and second channel portion side walls 15, 16.

The rotating die 3 can be arranged without flange portions which is shown at least in FIGS. 2B-2D, 4, 4A and 4B.

Figure 6:
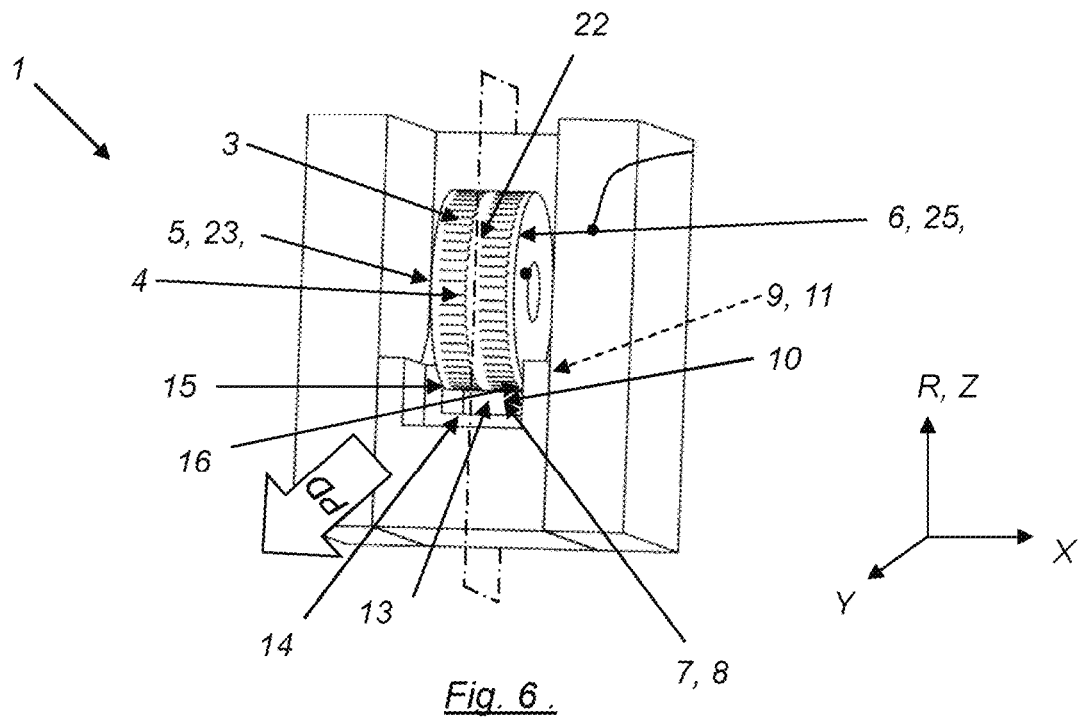

FIG. 5 schematically shows a cross-sectional side view of a device according to one example embodiment of the invention and FIG. 6 schematically shows a back view and outlet of the device in FIG. 5. In FIG. 5, the one or more walls 11 define a first cross-section 12 at the end of the first channel section 9 and wherein the second channel section 10 defines a second cross-section 17 at a position where the distance between the circumferential surface 4 and the counter-bearing 14 is at a minimum, and wherein the geometry of the first channel section 9 is different from the second channel section such that the material passing through the first channel section 9 changes form when entering the second channel section 10.

Figure 7:
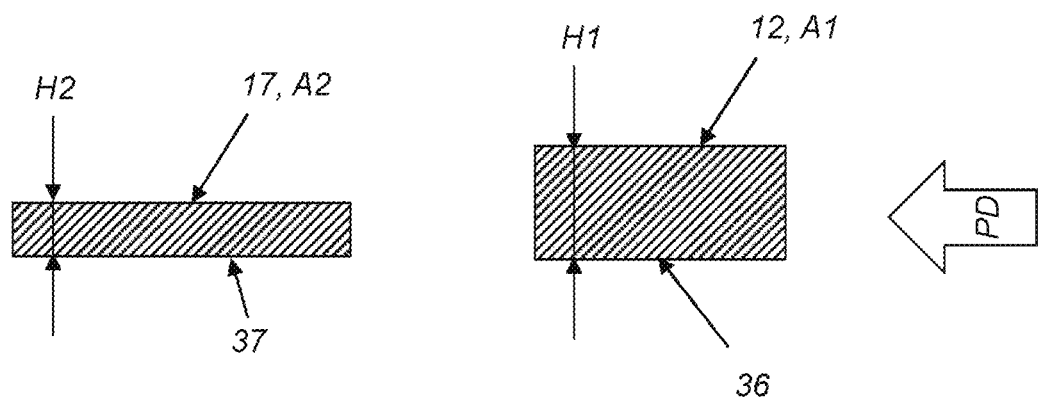
FIG. 7 schematically shows a cross-section of the master profile taken in a first cross-section of FIG. 5 and a cross-section of the final profile taken in the second cross-section of FIG. 5 according to one example.

FIG. 7 schematically shows a cross-section of the master profile 36 taken in the first cross-section 12 of FIG. 5 and a cross-section of the final profile 37 taken in the second cross-section 17 of FIG. 5 according to one example;

Referring also to FIGS. 1-2D, FIG. 7 schematically shows a cross-section of the master profile 36 and the final profile 37 when using a non-textured rotating die, i.e. no pattern 38 with indentations 38 as described above.

Figure 8:
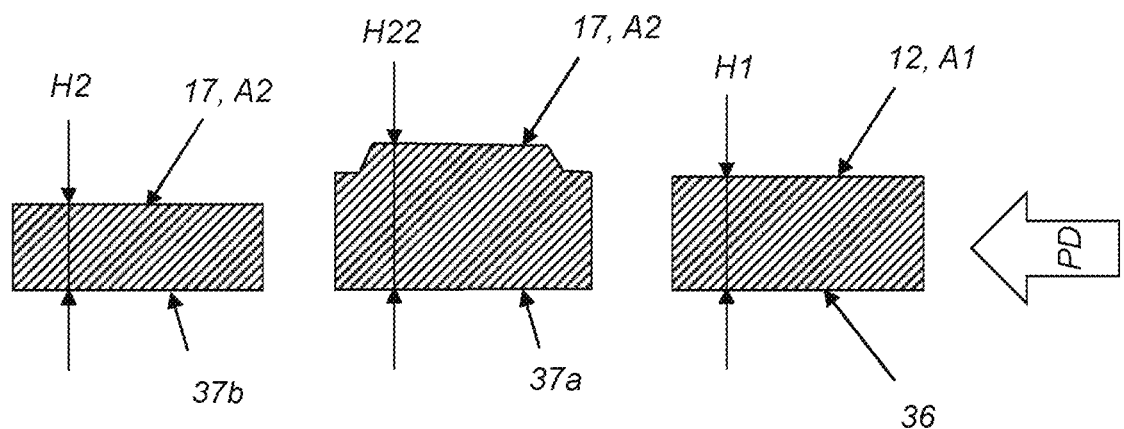
FIG. 8 schematically shows a cross-section of the master profile taken in a first cross-section of FIG. 5 and a first cross-section of the final profile taken in the second cross-section of FIG. 5 when the rotating die has imprinted a pattern in the final profile and a second cross-section of the final profile taken in the second cross-section of FIG. 5 when the rotating die has not imprinted a pattern in the final profile.

FIG. 8 schematically shows a cross-section of the master profile 36 taken in the first cross-section 12 of FIG. 5 and a first cross-section of the final profile 37 taken in the second cross-section 17 of FIG. 5 when the rotating die 3 has imprinted a pattern 39 in the final profile and a second cross-section of the final profile 37 taken in the second cross-section 17 of FIG. 5 when the rotating die 3 has not imprinted a pattern 39 in the final profile;

Referring also to FIGS. 1-2D, FIG. 8 schematically shows a cross-section of the master profile 36 and the final profile 37 when using a textured rotating die, i.e. with a pattern 38 with indentations 38 as described above. The pattern 38 in the rotating die causes a corresponding opposite pattern 39 in the final profile, i.e. when the pattern 38 in the rotating die 3 comprises an indentation 38, it causes a corresponding opposite pattern 39 comprising an elevation 39 in the final profile 37. In FIG. 8 the cross-section of the final profile 37 has been denoted 37a when the final profile has an elevation 39 caused by the indentation 38. In FIG. 8 the cross-section of the final profile 37 has been denoted 37b when the final profile lacks an elevation 39 caused by the circumferential surface 4 of the rotating die 3 in the space between the indentations 38.

Referring to FIGS. 1-2D and FIGS. 7 and 8, the master profile 36 has a first cross-section area geometry A1 corresponding to the first cross-section 12 and wherein the final profile 37 has a second cross-section area geometry A2 defined by the second cross-section 17, wherein the first cross-section area geometry A1 is different from the second cross-section area geometry A2 in any given comparable position, wherein the maximum pressure and thus the minimum distance D2 in the second channel section 10 is dependent on a difference of cross-section area geometry A1 of the master profile 36 and the cross-section area geometry A2 of the final profile 37.

FIG. 5 shows that the walls 11 are static and define a first cross-section 12 at the end of the first channel section 9 and wherein the second channel section 10 defines a second cross-section 17 at a position where the distance D2 between the circumferential surface 4 and the counter-bearing 14 is at a minimum, and wherein the geometry of the first channel section 9 is different from the second channel section 10 such that the material passing through the first channel section 9 changes form when entering the second channel section 10.

The minimum distance D2 in the height direction Z between the circumferential surface 4 and the counter-bearing 14 in the second cross-section 17 is less than a maximum distance D1 in the height direction in the first cross-section 12. This has the advantage of forcing the material to change form and start flowing in various directions dependent on the shape and form of the rotating die 3 and shape and form of the counter-bearing 14 opposite the rotating die 3.

Due to the geometrical difference in the first channel section 9 and the second channel section 10, the pressure in the second channel section 10 is increased or maintained to such level that the material will transform fast enough to saturate the second channel section, including an imprint of the rotating die.

The change of geometry in the master profile 36 and final profile 37 in FIGS. 7 and 8 is relevant for all examples discussed above and below. It should be noted that the first channel section 9 and the second channel section 10 can be formed with different cross-section geometries such as oval, round, polygon, undulating or a combination of one or many shapes.

With reference to FIG. 1-2D, the second channel section 10 is advantageously arranged in relation to the first channel section 9 with a predetermined second distance D2, shown in FIG. 5, between the radially outermost portion of the circumferential surface 4 of the rotating die 3 and the counter-bearing 14 in the channel portion 13 being less than a predetermined first distance D1, shown in FIG. 5, between the most far apart portions of the first channel section 9 taken in a height direction Z coinciding with the radial direction, and/or wherein:

the second channel section 10 is arranged in relation to the first channel section 9 with a predetermined fourth distance D4, shown in FIG. 1, between the innermost narrowest portions of the channel portion 13 in the width direction X being greater than a predetermined third distance D3, shown in FIG. 1, between side walls in the first channel section taken in the width direction X at the exit area from the first channel.

This change in both height and width forces the material to reform and the narrower first channel section gives a locally decreased pressure when entering the channel section since the first and second side portions are in the wake, i.e. behind the side walls in the first channel.

Furthermore, with reference to FIG. 1 the first and second side walls 5, 6 are positioned in relation to the first and second channel portion side walls 15, 16 such that the first and second side walls 5, 6 are rotatably connected to the first and second channel portion side walls 15, 16 with a tolerance arranged dependent on product material and the geometrical relation between the first and second channel sections 9, 10

The circumferential surface 4 may comprise a textured portion 30 that can cover all the rotating die but the annular recess portion, or the first side portion 4 comprises a non-textured portion 31 extending between the first flange portion 18 and the textured portion 30 and wherein the second side portion 25 comprises a non-textured portion 32 between the second flange portion 19 and the textured portion 30.

The non-textured portions 31, 32 advantageously has a radius less than a radius to an imprint depth of the textured portion 30, especially in the annular recess 19 portion. However according to one example (not shown), the circumferential surface 4 can be non-textured but with a smooth surface or a micro-patterned surface. The non-textured rotating die can have a shape being cylindrical or undulating.

Figure 9:
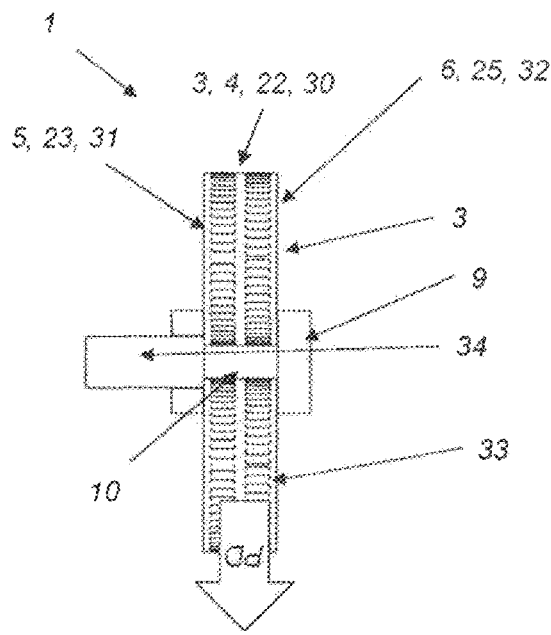
FIG. 9 schematically shows a back view and outlet of an assembly of rotary dies including three rotary dies.
Figure 10:
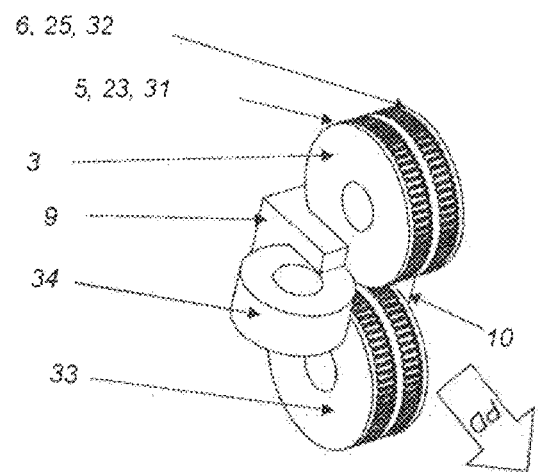
FIG. 10 schematically shows a perspective view of an assembly according to FIG. 9.

FIG. 9 schematically shows a back view and outlet of an assembly of rotary dies 3 including three rotary dies, 3, 33, 34 and FIG. 10 schematically shows a perspective view of an assembly according to FIG. 9. With references to FIGS. 1, 5 and 6, the channel portion 13 comprises a second rotating die 33 arranged opposite the first rotating die 3 replacing the counter-bearing 14 in FIGS. 1, 5 and 6. The second rotating 33 die can either replace the counter-bearing 14 in its entirety or can be a part of a static counter-bearing 14 (not shown). The second rotating 33 die can be arranged in a similar way as the above described first rotating die 3 to create same or different patterns on two sides of the profile product. The second rotating die 33 can comprise annular recesses and/or flange portions that can be arranged to cooperate with annular recesses 29 and/or flange portions 18, 19 of the first rotating die 3.

According to one example shown in FIGS. 9 and 10, the channel portion 13 (shown in FIGS. 1, 5 and 6) comprises a third rotating die 34 arranged at an angle to the first rotating die. This rotating die replaces the opposing first or second channel portion side wall 15, 16 entirely or partly. The third rotating die 34 can be arranged together with only the first rotating die or together with both the first and second rotating die. Hence, the above described arrangement with a first rotating die 3 and a second opposing rotating die 33 can be assembled without the third rotating die 34.

Figure 11:
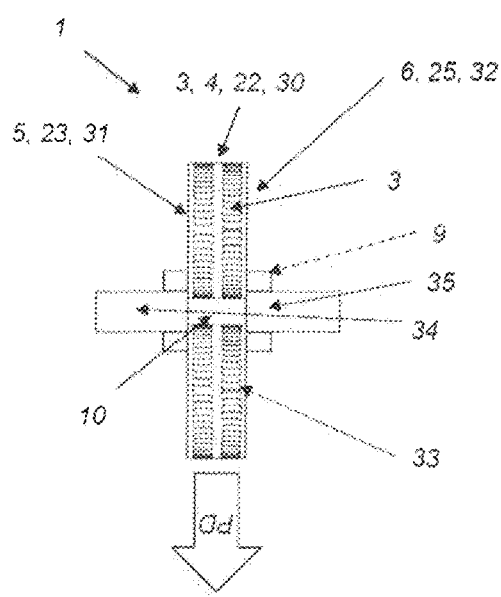
FIG. 11 schematically shows a back view and outlet of an assembly of rotary dies including four rotary dies.
Figure 12:
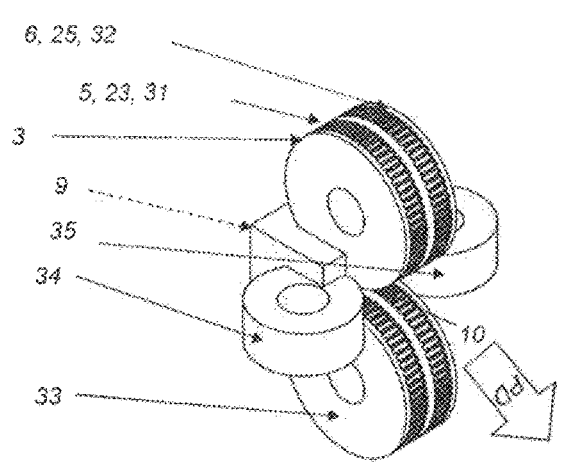
Figure 19:
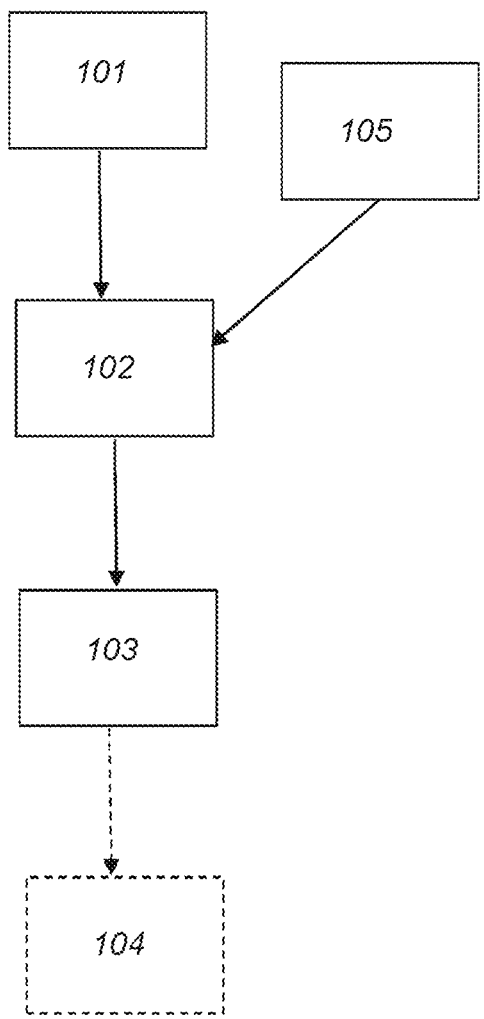
FIG. 19 schematically shows a flow chart of a method for producing a profile product by use of a device according to what has been described in connection to FIGS. 1-18.

FIG. 11 schematically shows a back view and outlet of an assembly of rotary dies including four rotary dies, and wherein and FIG. 12 schematically shows a perspective view of an assembly according to FIG. 19. FIGS. 11 and 12 show that the channel portion 13 (shown in FIGS. 1, 5 and 6) comprises a fourth rotating die 35 arranged opposite the third rotating die 34. The fourth rotating die 34 can as an alternative be arranged together with only the first rotating die 3 or together with both the first and second rotating die 3, 33.

The third and/or the fourth rotating die(s) 34, 35 can be arranged in a similar way as the above described first rotating die 3 to create same or different patterns on two sides of the profile product. The third and/or fourth rotating dies 34, 35 can comprise annular recesses and/or flange portions that can be arranged to cooperate with annular recesses 29 and/or flange portions 18, 19 of the first rotating die 3.

According to one example, two or more rotating dies are synchronised. This has the advantage of feeding the material at the same speed. However, it could be possible to also use non-synchronous rotating dies in order to create friction and/or a special pattern and/or to compensate for material differences.

The device can be arranged with a combination of textured and non-textured rotating dies 3; 33; 34; 35.

FIGS. 13-19 schematically show a co-extrusion device 1, 1aa and/or an on-extrusion device 1, 1aa comprising an extrusion and/or pultrusion device 1, la according to any one of the examples discussed above, wherein the device 1, 1aa comprises at least two inlet channels 45, 46, 47 that connects directly or indirectly to the second channel section 10, wherein each of the at least two inlet channels 45, 46, 47 is configured to feed one or more materials at a predetermined distance upstream from the second channel section 10 or to a marriage point for the at least two inlet channels 45, 46, 47 in connection to where the first channel section 9 transitions into the second channel section 10.

Here, co-extrusion refers to where at least two material streams are together processed and formed into the master profile and then into the final profile or where the at least two material streams are together processed and formed into the final profile. Here, on-extrusion refers to where the at least two material streams are positioned in a layered fashion either by being together processed and formed into the master profile and then into the final profile or by bringing together the at least two material streams into the master profile at the marriage point and thereafter together processing and forming the joint at least two material streams into the final profile in the second channel section 10.

Figure 13:
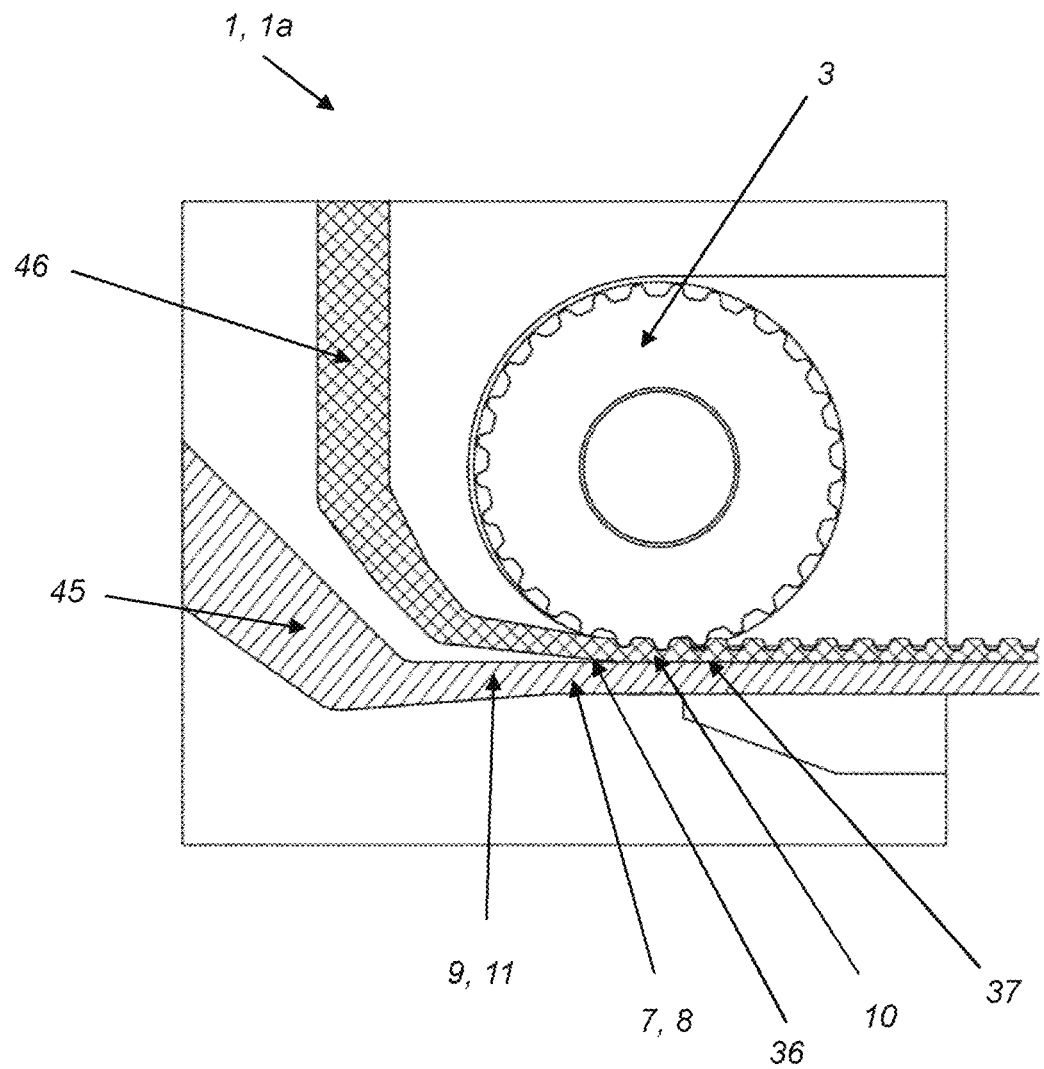
FIGS. 13-18 schematically show co-extrusion device and/or an on-extrusion device comprising a device according to any one of FIGS. 1-12.

FIG. 13 schematically shows a cross-section side view of a device 1, la, la according to the invention. FIG. 13 shows that the profile definition zone 7 comprises a first inlet channel 45 in the form of the first channel section 9 and a second inlet channel 46 in the form of a third channel section 46 connected to the profile definition zone 7 upstream the second channel section 10 for feeding an additional material to the second channel section 10 for forming a layered profile product 2 with material from the first channel section 9.

According to one example, the third channel section 46 is an extrusion or pultrusion channel similar to the first channel section 9 arranged to work the material. According to one example, the third channel section 46 is a third channel section that 46 is configured as a conveyer unit for conveying a material to the profile definition zone 7.

Figure 14:
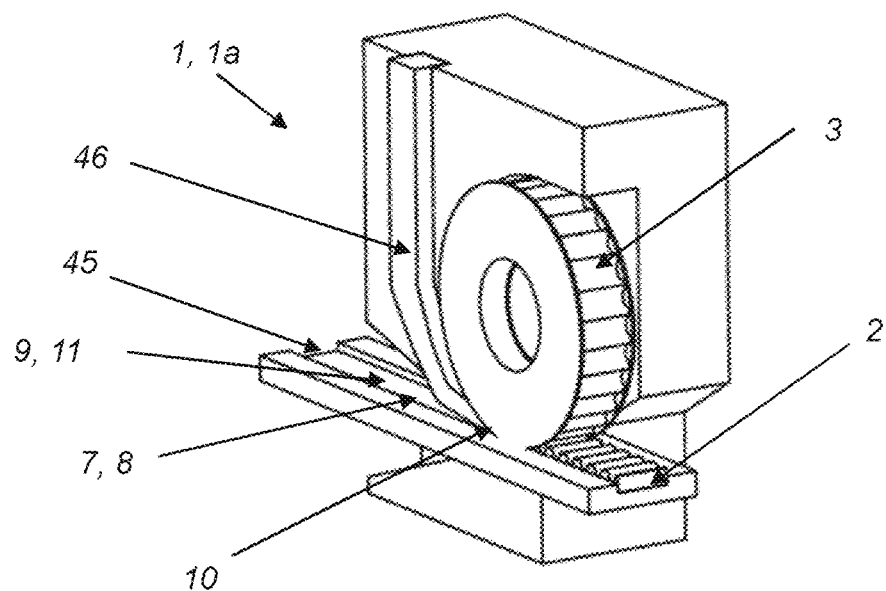
Figure 15:
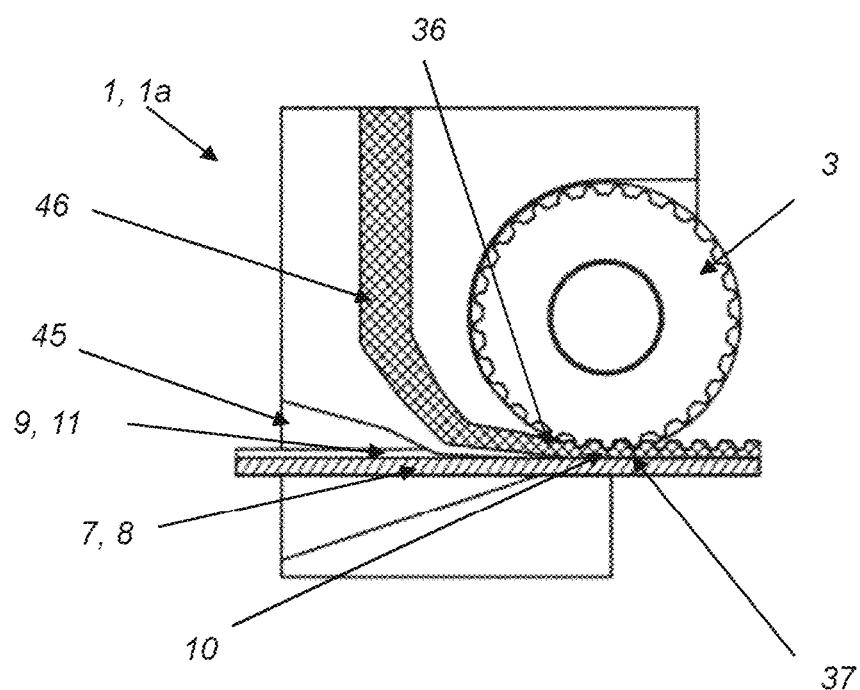

FIG. 14 schematically shows a perspective view of a device according to invention and FIG. 15 schematically shows a cross-section side view of a device according to the invention. FIGS. 13-15 show in different ways that the device 1, la, la comprises one rotating device 3 as described above and two material streams that are brought together via the first and third channel sections 9, 46.

Figure 16:
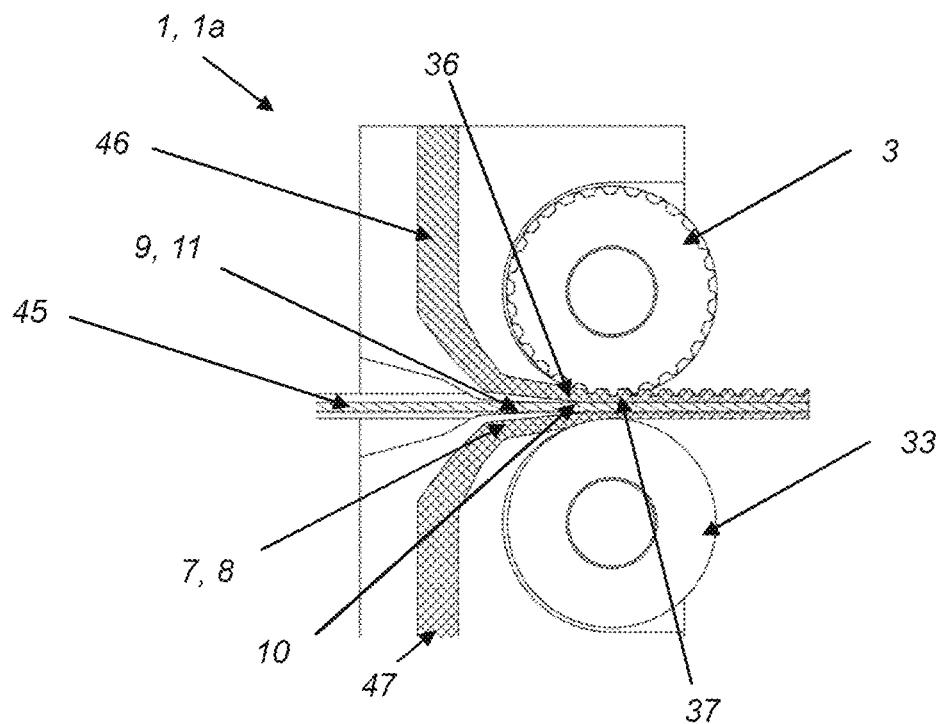

FIG. 16 schematically shows a cross-section side view of a device according to the invention where the device comprises two opposing rotating dies 3, 33. FIG. 16 further shows that the device 1, 1aa comprises a first inlet channel 45 in the form of the first channel section and a second inlet channel 46 in the form of a third channel section 46 connected to the profile definition zone 7 upstream the second channel section 10 for feeding an additional material to the second channel section 10 for forming a layered profile product 2 with material from the first channel section 9. FIG. 16 further shows that the device comprises a third inlet channel 47 in the form of a fourth channel section 47 for feeding a third material to the profile definition zone 7.

According to one example, the fourth channel section 47 is an extrusion or pultrusion channel similar to the first channel section 9 arranged to work the material. According to one example, the fourth channel section 47 is a fourth channel section that is configured as a conveyer unit for conveying a material to the profile definition zone 7.

Figure 17:
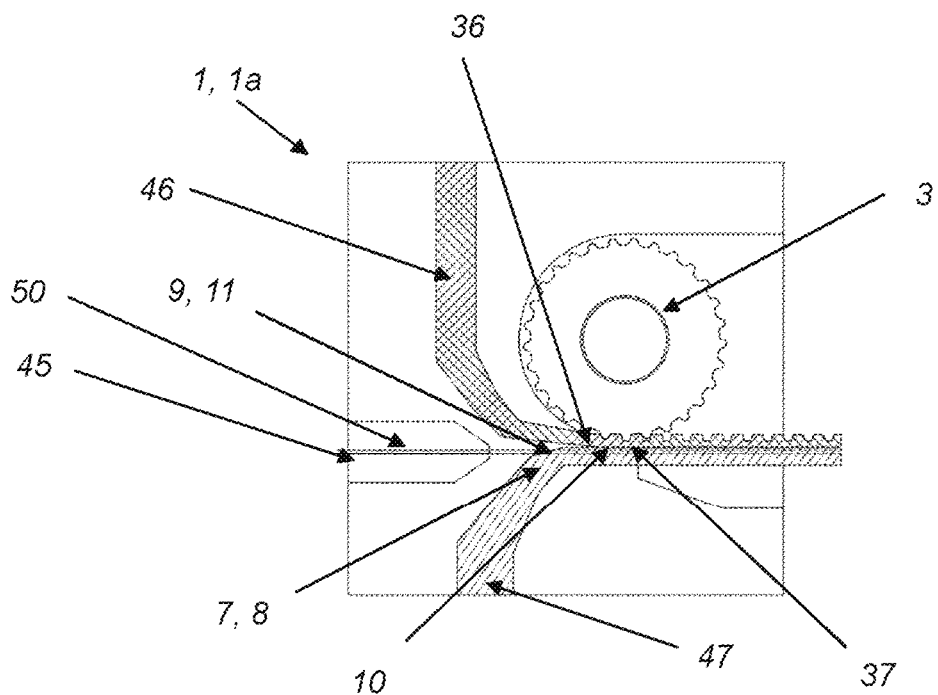

FIG. 17 schematically shows a cross-section side view of a device 1, 1a according to the invention comprising one rotating die 3 and a first, third and fourth channel sections 9, 45, 46 for feeding three different materials to the profile definition zone 7 according to what is discussed in connection to FIG. 16.

It should be noted that in FIGS. 13-17, the first inlet channel 45 may be the first channel section 9 or an inlet channel 45 that transports material to the first channel section 9.

FIG. 17 shows an example where the first inlet channel 45 conveys a solid material 50, e.g. a wire or a the like, to the first channel section 9 and where the second and third inlet channels 46, 47 introduces one or more materials to be extruded or pultruded in the first channel section 9 and the second channel section 10. The one or more materials may be layered onto the solid material or may surround the solid material.

Figure 18:
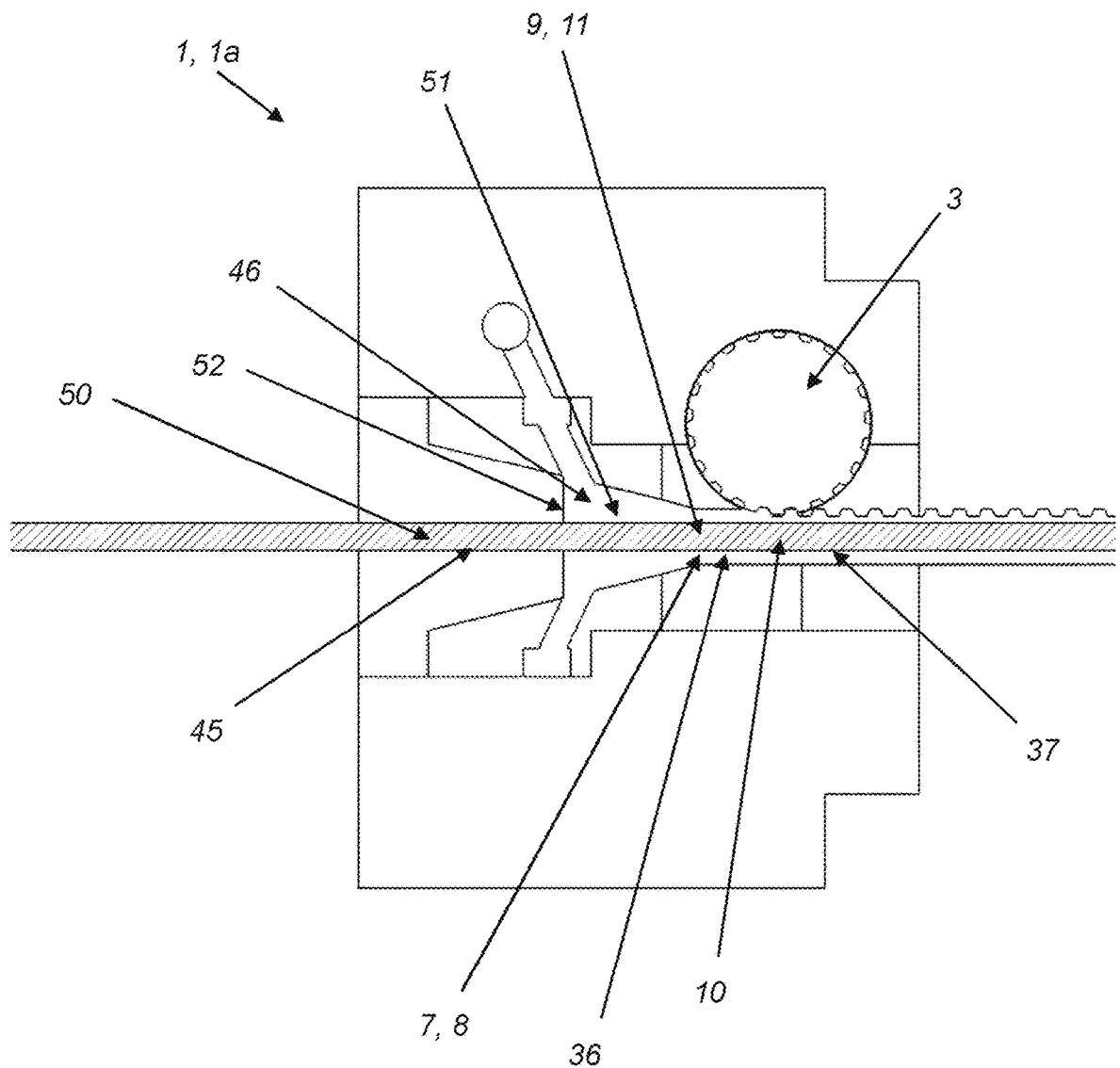

FIG. 18 schematically shows an example where the first inlet channel 45 conveys a continuous solid material in the form of a wire or the like, and a material to be extruded or pultruded in the first and second channel sections 9, 10. In FIG. 18, the first inlet channel 45 and the second inlet channel 46 are arranged such that the material from the second inlet channel 46 surrounds the solid material 50 and embeds the solid material 50. In FIG. 18, the second inlet channel 46 comprises a pressurized chamber 51 upstream the first channel section 9 for forming the material around the solid material 50. The pressurized chamber 51 comprises a back wall 52 delimiting the pressurized chamber. The second inlet channel 46 comprises a feeding channel 53 to the pressurized chamber 51 for feeding the material to the chamber 51. The back wall 52 comprises the first inlet channel 45 that conveys the solid material 50 and acts as a stop for the material in the chamber to leak through the first inlet channel 45. Here, pressurized means that the material in the second inlet channel 46 is subject to pressure by the material being forced into the second inlet channel 46 and deformed in a similar way as described above with relation to the first channel section 9. In FIG. 18, the first and second channel sections 9, 10 plastically deforms the material in a similar manner as described above. Plastic deformation may take place also in the pressurized chamber, but is not limited to such deformation. Hence, the material in the pressurized chamber may be formed to surround the solid material without being plastically deformed. Also materials made from a viscoelastic material and/or plastically deformable material with elastic property and/or viscoplastic material with elastic property can be deformed in this example.

Here, solid material refers to a material that does not undergo any deformation in the profile definition zone. A non-exhaustive list of examples of solid materials are; bendable wire, stiff rod-like element, mesh of metal and/or fabric and/or composite and/or other suitable materials, a combination of such solid materials, etc.

With reference to FIGS. 13-19, the different materials are brought together before the second channel section 10 and is then worked in the second channel section as described above. The invention is not limited to three inlet channels 45, 46, 47 or three channel sections 9, 46, 47, but further inlet channels and channel sections are possible in order to manufacture a profile product with same or different materials in different layers.

According to any one of the preceding examples, the material that is fed into the device to form the profile product is either one homogenous material or a mixture of two or more materials that are blended and or layered. The materials can be blended in different ratios and may be blended into a homogeneous mix or a mix with gradients within the material. One material can be a solid and another material can be mouldable, e.g. stone bits and rubber. The material can also be a layered material comprising two or more layers of same or different materials. The material may comprise one or more strings of solid material that follow through the entire extrusion or pultrusion process, e.g. a wire or another reinforcement material being surrounded by the deformable material.

According to one example, the maximum allowable pressure applied by the rotating die 3 at the position of the minimum distance D2 is dependent on friction between the material and the counter bearing 14 in the second channel section 10.

According to one example, the device 1, 1a is configured to feed a friction material 48 between the counter-bearing 14 and the final profile 37 and/or configured to feed a friction material 48 between the rotating die 3 and the final profile 37.

According to one example, the friction material 48 is conveyed by the first and/or the second and/or the third inlet channels 45, 46, 47 at least during start-up of the device in order to control friction in connection to the rotating die 3 and/or the counter bearing 14. According to one example, the friction material 18 is conveyed by the first and/or the second and/or the third inlet channels 45, 46, 47 during a part of or the entire manufacturing process in order to control friction in connection to the rotating die 3 and/or the counter bearing 14.

According to one example, the friction material 48 is fed directly to the rotating die 3 such that the friction material rotates with the rotating die from a position before the second channel section 10 to the second channels section. FIG. 2A schematically shows that the device 1, 1a comprises an external friction material 48 feeding device 49 feeding the friction material 48 to the rotating die 3. As stated above, the friction material 18 feeding device 49 can be either of the first, second or third inlet channels 45, 46, 47 (not shown). Furthermore, the friction material 48 may be a solid material, a liquid or a gas, or a combination thereof.

The invention is not limited to the above examples but may be varied within the scope of the appending claims. For example, the maximum pressure and thus the minimum distance D2 in the second channel section 10 is dependent on the total feeding rate of material in the first channel section 9, type of material, and temperature of the material when entering the second channel section 10.

FIG. 19 schematically shows a flow chart of a method for producing a profile product by use of a device according to what has been described in connection to FIGS. 1-18, wherein the method comprises the step shown in Box 101
feeding a material to the first channel section 9 and forming the same into a master profile 36 in the first channel section 9, the step shown in Box 105
feeding a second material to the first channel section 9 and forming the same into a master profile 36 in the first channel section 9 or feeding a second material to the second channel section 10,
and the step shown in Box 102
feeding the material and thus master profile 36 further to the second channel section and forming the same in the second channel section 10,
And the step in Box 103
transforming the final profile 37 into the profile product 2.

According to one example, the method further comprises the step in box 104,
stretching the final profile 37 and/or the profile product 2 for achieving the same distance in the pattern along the production direction, i.e. to achieve equal distance between elevations and/or indentations in the pattern 40 along the production direction.

According to one example, the distance between indentations in the pattern on the rotating die is less than a distance between indentations in the corresponding pattern in the production direction on the profile product, wherein the pulling and stretching device is configured to stretch the final profile and/or the profile product so that high precision in distance between features on profile can be achieved by adjustment stretching.

The invention claimed is:

1. An extrusion or pultrusion device for forming a profile product made from a material in a production direction along which the profile product travels, said device comprising:
a rotating die, extending in a radial direction and a width direction, having two opposite first and second side walls and an outer circumferential surface extending in the width direction therebetween, wherein the rotating die comprises a first side portion in connection inward to the first side wall, a second side portion in connection inward to the second side wall, and a mid-portion defining the circumferential surface extending between the first and second side portions, and
a profile definition zone having a longitudinal direction coinciding with the production direction, a height direction, and a width direction being perpendicular to the height direction, and comprising a through channel comprising a first channel section followed by a second channel section downstream the first channel section with reference to the production direction, wherein the rotating die is rotatable about an axis extending across the production direction and arranged to allow the outer circumferential surface to, while the rotating die rotates, exert a pressure onto a surface of the material when fed through the profile definition zone, wherein:
the first channel section is circumferentially delimited by one or more walls,
and wherein:
the second channel section is circumferentially delimited by:
the circumferential surface of the rotating die,
a channel portion comprising
a counter-bearing opposite the rotating die, and
opposing first and second side walls of the channel portion extending between the rotating die and the counter-bearing,
wherein the first channel section is configured to deform the material plastically into a master profile having a maximum height at a predetermined feeding rate dependent on the material and minimum cross-sectional area with a first maximum height of the first channel section, and wherein the second channel section is configured to further deform the material into a final profile continuing in the production direction downstream of the second channel section and having a minimum height by the rotating die being configured to apply increasing pressure on the master profile against the counter-bearing when the master profile exits the first channel section, and
wherein the device comprises at least two inlet channels that connects directly or indirectly to the second channel section, wherein each of the at least two inlet channels is configured to feed one or more materials at a predetermined distance upstream from the second channel section or to a marriage point for the at least two inlet channels in connection to where the first channel section transitions into the second channel section.

2. A device according to claim 1, wherein the at least two inlet channels comprise a first and a second inlet channel, and wherein the profile definition zone comprises the first inlet channel in the form of the first channel section and a second inlet channel in the form of a third channel section connected to the profile definition zone upstream the second channel section for feeding an additional material to the second channel section for forming a layered profile product with material from the first channel section.

3. A device according to claim 2, wherein the third channel section is an extrusion or pultrusion channel arranged to work the material or wherein the third channel section is configured as a conveyer unit for conveying a material to the profile definition zone.

4. A device according to claim 2, wherein the at least two inlet channels further comprise a third inlet channel in the form of a fourth channel section for feeding additional material to the profile definition zone, wherein the fourth channel section is an extrusion or pultrusion channel arranged to work the material or wherein the fourth channel section is configured as a conveyer unit for conveying a material to the profile definition zone.

5. A device according to claim 4, wherein the first inlet channel conveys a solid material to the first channel section and the second and third inlet channels introduce one or more materials to be extruded or pultruded in the first channel section and the second channel section, and wherein the one or more materials are layered onto the solid material or surround the solid material.

6. A device according to claim 5, wherein the first inlet channel and the second inlet channel are arranged such that the material from the second inlet channel surrounds the solid material and embeds the solid material.

7. A device according to claim 5, wherein the second inlet channel comprises a pressurized chamber upstream the first channel section for forming the material around the solid material, wherein the pressurized chamber comprises a back wall delimiting the pressurized chamber, wherein the second inlet channel comprises a feeding channel to the pressurized chamber for feeding the material to the pressurized chamber, and wherein the back wall comprises the first inlet channel that conveys the solid material and acts as a stop for the material in the chamber to leak through the first inlet channel.

8. A device according to claim 1, wherein the device is configured to feed a friction material between the counter-bearing and the final profile and/or is configured to feed a friction material between the rotating die and the final profile.

9. A device according to claim 8, wherein the at least two inlet channels comprise first, second, and third inlet channels, wherein the friction material is conveyed by the first and/or the second and/or the third inlet channels at least during start-up of the device in order to control friction in connection to the rotating die and/or the counter bearing or wherein the friction material is conveyed by the first and/or the second and/or the third inlet channels during a part of or the entire manufacturing process in order to control friction in connection to the rotating die and/or the counter bearing.

10. A device according to claim 8, wherein the friction material is fed directly to the rotating die such that the friction material rotates with the rotating die from a position before the second channel section to the second channel section.

11. A device according to claim 1,
wherein the rotating die is configured at a minimum distance between the rotating die and the counter-bearing dependent on a maximum allowable pressure applied by the rotating die at the position of that minimum distance, wherein the maximum allowable pressure corresponds to the maximum difference in height of the master profile and the final profile and is dependent on a pattern in the circumferential surface of the rotating die.

12. A device according to claim 11, wherein the maximum allowable pressure applied by the rotating die at the position of the minimum distance is dependent on friction between the material and the counter bearing in the second channel section.

13. A device according to claim 1, wherein first channel section is configured to deform the material provided as a viscoelastic material and/or a plastically deformable material with elastic property and/or a viscoplastic material with elastic property into the master profile when exiting the first channel section,
wherein the first channel section comprises a wake element having a predetermined height dependent on the elastic property of the material,
wherein the wake element is positioned in at least the height direction and wherein the second channel section is configured to further deform the material into the final profile when the master profile exits the first channel section, and wherein the rotating die is configured at a minimum distance between the rotating die and the counter-bearing dependent on a maximum allowable pressure applied by the rotating die at the position of that minimum distance, wherein the maximum allowable pressure corresponds to the maximum difference in height of the master profile and the final profile, on a pattern in the circumferential surface of the rotating die, and on the elastic property of the material.

14. A device according to claim 13, wherein the wake element is arranged where the first channel section transitions into the second channel section, wherein the wake element comprises an upper edge with a lowest part, in the height direction, wherein the wake element upper edge delimits an upper portion, in the height direction, of the wake element in the first channel section where the first channel section transitions into the second channel section or wherein the wake element is arranged at a predetermined distance upstream in the production direction from where the first channel section transitions into the second channel section, wherein the first channel section comprises an upper edge with a lowest part, in the height direction, and wherein the first channel section upper edge delimits an upper portion, in the height direction, of a wall of the or more walls of the first channel section where the first channel section transitions into the second channel section.

15. A device according to claim 13, wherein the one or more walls of the first channel section comprises at least two side walls in the form of a top pre-bearing and an opposing bottom pre-bearing, wherein the top pre-bearing is arranged over the opposing bottom pre-bearing in the height direction, and wherein the top pre-bearing and/or the bottom pre-bearing comprises the wake element.

16. A device according to claim 1, wherein the master profile height when exiting the first channel section is less than or equal to a max master profile height in the second channel section before reaching the rotating die due to elasticity of the material forming the master profile.

17. A device according to claim 1, wherein the one or more walls define a first cross-section at the end of the first channel section and wherein the second channel section defines a second cross-section at a position where the distance between the circumferential surface and the counter-bearing is at a minimum, and wherein the geometry of the first channel section is different from the second channel section such that the material passing through the first channel section changes form when entering the second channel section, and
wherein the master profile has a first cross-section area geometry corresponding to the first cross-section and wherein the final profile has a second cross-section area geometry defined by the second cross-section, wherein the first cross-section area geometry is different from the second cross-section area geometry in any given comparable position therebetween, and wherein the maximum pressure and the minimum distance in the second channel section is dependent on a difference of cross-section area geometry of the master profile and the cross-section area geometry of the final profile and the elastic property of the material.

18. A device according to claim 1, wherein the rotating die comprises a pattern comprising at least one indentation, wherein the rotating die is configured at a maximum distance between a bottom of the indentation and the counter-bearing dependent on a minimum allowable pressure applied by the rotating die at the position of that maximum distance for achieving plastic deformation of the material in the indentation.

19. A device according to claim 18, wherein the device comprises a pulling and stretching device, wherein a distance between indentations in the pattern on the rotating die is less than a distance between elevations in a corresponding pattern in the production direction on the profile product, and wherein the pulling and stretching device is configured to adjustably stretch the final profile and/or the profile product so that high precision in distance between features of the corresponding pattern on the profile product are achieved by adjustment stretching.

20. A device according to any one of the preceding claim 1, wherein the device comprises a pulling and stretching device arranged downstream the second channel section and configured to pull the material exiting the second channel section for transforming the final profile to the profile product.

21. A device according to claim 1, wherein the rotating die comprises a cooling device configured to cool down the outer circumferential surface of the rotating die so that the temperature of the outer circumferential surface is below a predetermined allowed temperature of the material.

22. A device according to claim 1, wherein the material is either one homogenous material or a mixture of two or more materials that are blended and/or layered.

23. A method for producing a profile product by use of a device according to claim 1, wherein the method comprises
- feeding a first material to the first channel section and forming the first material into a master profile in the first channel section,
- feeding a second material to the first channel section or to the second channel section so as to form a master profile from the first and second materials,
- feeding the master profile to the second channel section and forming the master profile into a final profile in the second channel section, and
- transforming the final profile into the profile product.

24. A method according to claim 23, further comprising stretching the final profile and/or the profile product.

25. A device according to claim 1, wherein the first and second side portions of the rotating die comprises first and second flange portions extending in a radial direction with an extension exceeding the radial extension of at least a part of the mid-portion of the rotating die, wherein the first and second flange portions are arranged to prevent movement of the material outside the rotating die.

\* \* \* \* \*